United States Patent
Hsueh et al.

(10) Patent No.: US 11,953,654 B2
(45) Date of Patent: *Apr. 9, 2024

(54) IMAGE CAPTURING LENS SYSTEM, IMAGE CAPTURING APPARATUS AND ELECTRONIC DEVICE

(71) Applicant: LARGAN PRECISION CO., LTD., Taichung (TW)

(72) Inventors: Chun-Che Hsueh, Taichung (TW); Hsin-Hsuan Huang, Taichung (TW); Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 40 days.

This patent is subject to a terminal disclaimer.

(21) Appl. No.: 17/460,427

(22) Filed: Aug. 30, 2021

(65) Prior Publication Data
US 2021/0389560 A1 Dec. 16, 2021

Related U.S. Application Data

(63) Continuation of application No. 16/574,155, filed on Sep. 18, 2019, now Pat. No. 11,137,574, which is a (Continued)

(30) Foreign Application Priority Data

Feb. 2, 2016 (TW) .................. 105103311

(51) Int. Cl.
*G02B 13/00* (2006.01)
*G02B 9/34* (2006.01)
*G02B 27/01* (2006.01)

(52) U.S. Cl.
CPC ............. *G02B 13/004* (2013.01); *G02B 9/34* (2013.01); *G02B 2027/011* (2013.01); (Continued)

(58) Field of Classification Search
CPC ...... G02B 13/004; G02B 9/34; G02B 27/017; G02B 27/0172; G02B 2027/011; (Continued)

(56) References Cited

U.S. PATENT DOCUMENTS 5,283,693 A   2/1994 Kohno et al.
6,862,408 B2  3/2005 Watanabe
(Continued)

FOREIGN PATENT DOCUMENTS

CN   101788707 A   7/2010
CN   103076670 A   5/2013
(Continued)

OTHER PUBLICATIONS

Serway et al. "College Physics" p. 603 (Year: 1985).*

*Primary Examiner* — George G. King
(74) *Attorney, Agent, or Firm* — McClure, Qualey & Rodack, LLP

(57) ABSTRACT

An image capturing lens system includes, in order from an object side to an image side, a first lens element with positive refractive power having an object-side surface being convex in a paraxial region thereof and an image-side surface being concave in a paraxial region thereof, a second lens element with negative refractive power having an object-side surface being concave in a paraxial region thereof and an image-side surface being convex in a paraxial region thereof, a third lens element with positive refractive power having an object-side surface being concave in a paraxial region thereof and an image-side surface being convex in a paraxial region thereof, and a fourth lens element with negative refractive power having an object-side surface being convex in a paraxial region thereof and an image-side surface being concave in a paraxial region thereof.

17 Claims, 26 Drawing Sheets

Related U.S. Application Data continuation of application No. 15/869,252, filed on Jan. 12, 2018, now Pat. No. 10,459,197, which is a continuation of application No. 15/161,431, filed on May 23, 2016, now Pat. No. 9,904,034.

(52) U.S. Cl.
CPC ............. *G02B 2027/0123* (2013.01); *G02B 2027/0138* (2013.01); *G02B 2027/015* (2013.01); *G02B 2027/0152* (2013.01); *G02B 27/017* (2013.01); *G02B 27/0172* (2013.01); *G02B 2027/0178* (2013.01)

(58) Field of Classification Search
CPC .... G02B 2027/0123; G02B 2027/0138; G02B 2027/015; G02B 2027/0152; G02B 2027/0178
See application file for complete search history.

(56) References Cited

U.S. PATENT DOCUMENTS

| | | | |
|---|---|---|---|
| 6,950,246 B2 | 9/2005 | Amanai | |
| 7,012,765 B2 | 3/2006 | Matsui et al. | |
| 7,215,492 B2 | 5/2007 | Sato et al. | |
| 7,466,497 B2 | 12/2008 | Park et al. | |
| 7,692,877 B2 | 4/2010 | Tang et al. | |
| 7,907,353 B2 | 3/2011 | Onoda | |
| 8,385,011 B2 | 2/2013 | Sato et al. | |
| 8,411,377 B2 | 4/2013 | Tsai et al. | |
| 8,503,112 B2 | 8/2013 | Hsu et al. | |
| 8,730,590 B1 | 5/2014 | Tsai et al. | |
| 8,879,168 B1 | 11/2014 | Hsu et al. | |
| 8,908,290 B1 | 12/2014 | Liao et al. | |
| 9,316,809 B2 | 4/2016 | Hsu et al. | |
| 9,405,098 B1 | 8/2016 | Tang et al. | |
| 11,137,574 B2* | 10/2021 | Hsueh | G02B 13/004 |
| 2007/0008625 A1 | 1/2007 | Park et al. | |
| 2010/0020418 A1* | 1/2010 | Onoda | G02B 13/18 359/773 |
| 2011/0058262 A1 | 3/2011 | Chen et al. | |
| 2011/0261470 A1 | 10/2011 | Chen et al. | |
| 2012/0044403 A1 | 2/2012 | Tang | |
| 2012/0281299 A1 | 11/2012 | Hsu et al. | |
| 2013/0057969 A1 | 3/2013 | Lai et al. | |
| 2013/0077182 A1 | 3/2013 | Park | |
| 2013/0141633 A1 | 6/2013 | Tang et al. | |
| 2013/0155526 A1 | 6/2013 | Hsieh et al. | |
| 2013/0278714 A1 | 10/2013 | Hirose | |
| 2013/0308209 A1 | 11/2013 | Baba | |
| 2014/0043697 A1 | 2/2014 | Liao et al. | |
| 2014/0055663 A1 | 2/2014 | Chang et al. | |
| 2014/0055870 A1 | 2/2014 | Chang et al. | |
| 2014/0085737 A1 | 3/2014 | Oh et al. | |
| 2014/0146401 A1 | 5/2014 | Tsai et al. | |
| 2015/0109686 A1 | 4/2015 | Lee | |
| 2015/0116847 A1 | 4/2015 | Liao | |
| 2015/0168691 A1 | 6/2015 | Lee | |
| 2015/0185435 A1 | 7/2015 | Wang et al. | |
| 2015/0185438 A1 | 7/2015 | Wang et al. | |
| 2015/0260955 A1 | 9/2015 | Chen et al. | |
| 2015/0370039 A1* | 12/2015 | Bone | G02B 13/14 359/715 |
| 2016/0062079 A1 | 3/2016 | Liao et al. | |
| 2016/0131868 A1 | 5/2016 | Hsu et al. | |
| 2016/0161706 A1 | 6/2016 | Liao | |
| 2017/0102517 A1 | 4/2017 | Liao et al. | |
| 2017/0115469 A1* | 4/2017 | Choi | G02B 13/004 |
| 2017/0176716 A1 | 6/2017 | Lai et al. | |
| 2017/0329102 A1 | 11/2017 | Yuza et al. | |
| 2018/0307006 A1 | 10/2018 | Kang et al. | |
| 2019/0011669 A1 | 1/2019 | Tsai et al. | |
| 2019/0025546 A1 | 1/2019 | Zhao et al. | |

FOREIGN PATENT DOCUMENTS

| | | |
|---|---|---|
| CN | 202929277 U | 5/2013 |
| CN | 105425360 A | 3/2016 |
| CN | 108873271 A | 11/2018 |
| CN | 208432785 U | 1/2019 |
| JP | S5292533 A | 8/1977 |
| JP | H1184229 A | 3/1999 |
| JP | 2003177316 A | 6/2003 |
| JP | 2004-341512 A | 12/2004 |
| JP | 2005091666 A | 4/2005 |
| JP | 2005115309 A | 4/2005 |
| JP | 2006293324 A | 10/2006 |
| JP | 2007017984 A | 1/2007 |
| JP | 2008064884 A | 3/2008 |
| JP | 2011186297 A | 9/2011 |
| JP | 2012252193 A | 12/2012 |
| JP | 2014-153574 A | 8/2014 |
| TW | 201544840 A | 12/2015 |
| TW | 201600882 A | 1/2016 |
| WO | 2017078355 A1 | 5/2017 |

* cited by examiner

IMAGE CAPTURING LENS SYSTEM, IMAGE CAPTURING APPARATUS AND ELECTRONIC DEVICE

RELATED APPLICATIONS

This application is a continuation of U.S. application Ser. No. 16/574,155, filed on Sep. 18, 2019, U.S. Pat. No. 11,137,574 issued on Oct. 5, 2021, which is a continuation of U.S. application Ser. No. 15/869,252, filed on Jan. 12, 2018, U.S. Pat. No. 10,459,197 issued on Oct. 29, 2019, which is a continuation of U.S. application Ser. No. 15/161,431, filed on May 23, 2016, U.S. Pat. No. 9,904,034 issued on Feb. 27, 2018, which claims priority to Taiwan Application Serial Number 105103311, filed on Feb. 2, 2016, the entirety of which are incorporated by reference herein.

BACKGROUND

Technical Field

The present disclosure relates to an image capturing lens system and an image capturing apparatus. More particularly, the present disclosure relates to a compact image capturing lens system and an image capturing apparatus applicable to electronic devices.

Description of Related Art

In recent years, with personal electronic products getting lighter and thinner, the size of the components inside the personal electronic products are also reduced, which leads to the popularity of compact image capturing lens systems. However, the conventional image capturing lens systems are hard to provide a larger field of view while maintaining a compact size. Accordingly, the conventional image capturing lens systems with a larger field of view are bulky, which are difficult to be employed in compact personal electronic products, such as mobile devices, portable video recorders and wearable apparatus.

SUMMARY

According to one aspect of the present disclosure, an image capturing lens system includes, in order from an object side to an image side, a first lens element, a second lens element, a third lens element and a fourth lens element. The first lens element with positive refractive power has an object-side surface being convex in a paraxial region thereof and an image-side surface being concave in a paraxial region thereof. The second lens element with negative refractive power has an object-side surface being concave in a paraxial region thereof and an image-side surface being convex in a paraxial region thereof. The third lens element with positive refractive power has an object-side surface being concave in a paraxial region thereof and an image-side surface being convex in a paraxial region thereof. The fourth lens element with negative refractive power has an object-side surface being convex in a paraxial region thereof and an image-side surface being concave in a paraxial region thereof, wherein the image-side surface of the fourth lens element includes at least one convex shape in an off-axis region thereof. The image capturing lens system has a total of four lens elements. When a maximum of axial distances between every two lens elements of the first lens element, the second lens element, the third lens element and the fourth lens element which are adjacent to each other is ATmax, a minimum of the axial distances between every two lens elements of the first lens element, the second lens element, the third lens element and the fourth lens element which are adjacent to each other is ATmin, a curvature radius of the object-side surface of the third lens element is R5, a curvature radius of the image-side surface of the third lens element is R6, an axial distance between the first lens element and the second lens element is T12, an axial distance between the second lens element and the third lens element is T23, and an axial distance between the third lens element and the fourth lens element is T34, the following conditions are satisfied:

$1.0 < AT\max/AT\min < 8.0;$ $1.0 < (R5+R6)/(R5-R6) < 3.50;$ and $T34 < T12 < T23.$ According to another aspect of the present disclosure, an image capturing lens system includes, in order from an object side to an image side, a first lens element, a second lens element, a third lens element and a fourth lens element. The first lens element with positive refractive power has an object-side surface being convex in a paraxial region thereof and an image-side surface being concave in a paraxial region thereof. The second lens element with negative refractive power has an object-side surface being concave in a paraxial region thereof and an image-side surface being convex in a paraxial region thereof. The third lens element with positive refractive power has an object-side surface being concave in a paraxial region thereof and an image-side surface being convex in a paraxial region thereof. The fourth lens element with negative refractive power has an object-side surface being convex in a paraxial region thereof and an image-side surface being concave in a paraxial region thereof, wherein the image-side surface of the fourth lens element includes at least one convex shape in an off-axis region thereof. The image capturing lens system has a total of four lens elements. When a maximum of axial distances between every two lens elements of the first lens element, the second lens element, the third lens element and the fourth lens element which are adjacent to each other is ATmax, a minimum of the axial distances between every two lens elements of the first lens element, the second lens element, the third lens element and the fourth lens element which are adjacent to each other is ATmin, a focal length of the first lens element is f1, a focal length of the second lens element is f2, a focal length of the third lens element is f3, a focal length of the fourth lens element is f4, and an f-number of the image capturing lens system is Fno, the following conditions are satisfied:

$1.25 < AT\max/AT\min < 7.0;$ $(|f3|+|f4|)/(|f1|+|f2|) < 0.65;$ and $1.50 < \text{Fno} < 2.60.$ According to yet another aspect of the present disclosure, an image capturing apparatus includes the image capturing lens system according to the aforementioned aspect and an image sensor, wherein the image sensor is disposed on an image surface of the image capturing lens system.

According to further another aspect of the present disclosure, an electronic device includes the image capturing apparatus according to the aforementioned aspect.

According to yet further another aspect of the present disclosure, an image capturing lens system includes, in order from an object side to an image side, a first lens element, a second lens element, a third lens element and a fourth lens element. The first lens element with positive refractive power has an object-side surface being convex in a paraxial region thereof and an image-side surface being concave in a paraxial region thereof. The second lens element with negative refractive power has an object-side surface being concave in a paraxial region thereof and an image-side surface being convex in a paraxial region thereof. The third lens element with positive refractive power has an object-side surface being concave in a paraxial region thereof and an image-side surface being convex in a paraxial region thereof. The fourth lens element with negative refractive power has an object-side surface being convex in a paraxial region thereof and an image-side surface being concave in a paraxial region thereof, wherein the image-side surface of the fourth lens element includes at least one convex shape in an off-axis region thereof. The image capturing lens system has a total of four lens elements. When a maximum of axial distances between every two lens elements of the first lens element, the second lens element, the third lens element and the fourth lens element which are adjacent to each other is ATmax, a minimum of the axial distances between every two lens elements of the first lens element, the second lens element, the third lens element and the fourth lens element which are adjacent to each other is ATmin, a ratio of a focal length of the image capturing lens system and a focal length of the first lens element is P1, a ratio of the focal length of the image capturing lens system and a focal length of the second lens element is P2, a ratio of the focal length of the image capturing lens system and a focal length of the third lens element is P3, a ratio of the focal length of the image capturing lens system and a focal length of the fourth lens element is P4, an axial distance between the second lens element and the third lens element is T23, and a central thickness of the second lens element is CT2, the following conditions are satisfied:

$1.0 < AT\max/AT\min;$ $1.50 < (|P3|+|P4|)/(|P1|+|P2|) < 9.0;$ and $0.80 < T23/CT2 < 2.50.$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
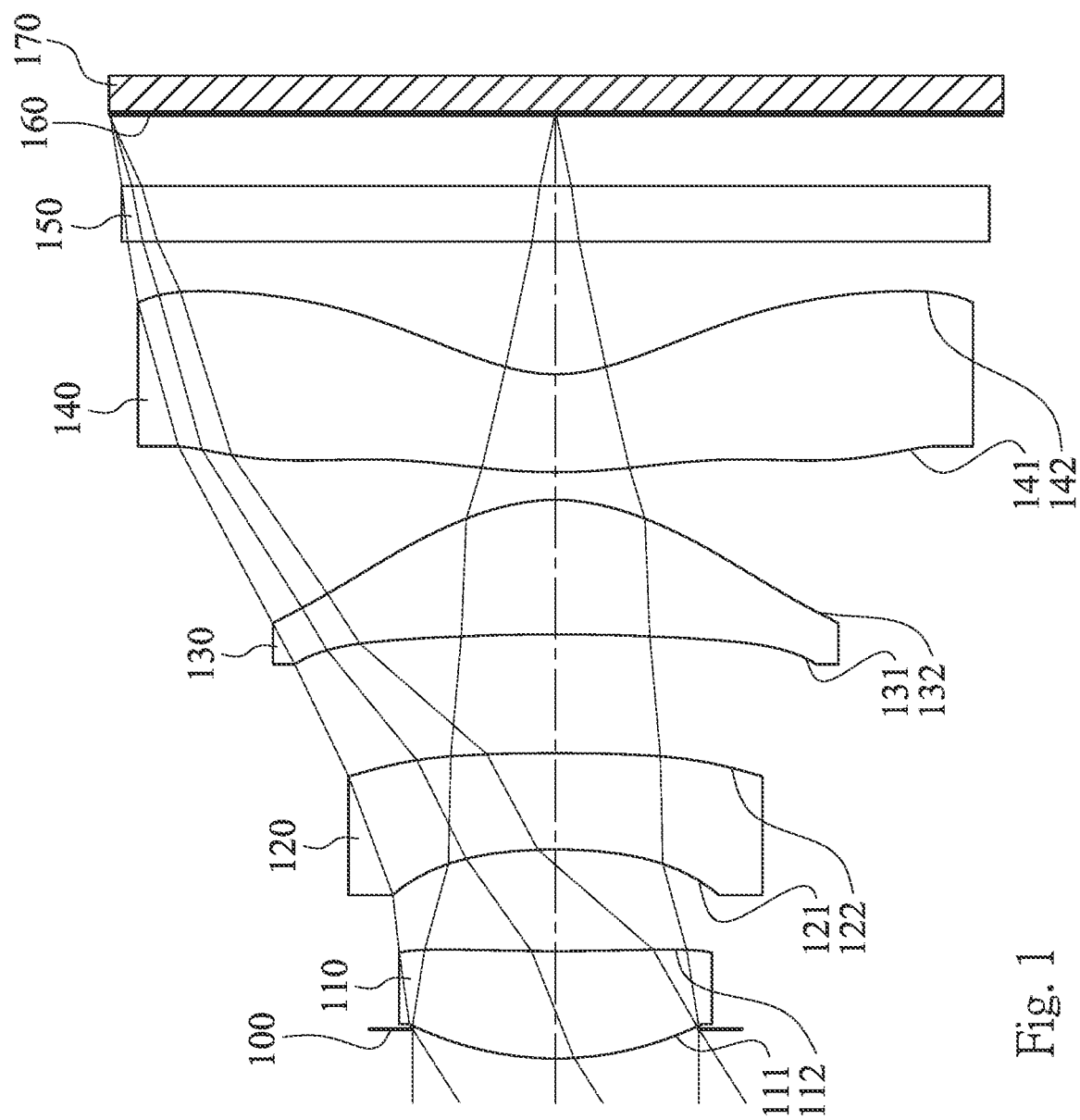
FIG. 1 is a schematic view of an image capturing apparatus according to the 1st embodiment of the present disclosure.

An image capturing lens system includes, in order from an object side to an image side, a first lens element, a second lens element, a third lens element and a fourth lens element, wherein the image capturing lens system has a total of four lens elements.

The first lens element with positive refractive power has an object-side surface being convex in a paraxial region thereof and an image-side surface being concave in a paraxial region thereof. Therefore, the total track length of the image capturing lens system can be reduced, and the strength of the positive refractive power can be adjusted so as to obtain a larger field of view.

The second lens element with negative refractive power has an object-side surface being concave in a paraxial region thereof and an image-side surface being convex in a paraxial region thereof. Therefore, the chromatic aberration can be corrected, and the image capturing lens system can have a larger field of view.

The third lens element with positive refractive power has an object-side surface being concave in a paraxial region thereof and an image-side surface being convex in a paraxial region thereof. Therefore, the light-converging ability of the image capturing lens system is sufficient, which can lead to a more effective way of shortening the total track length while correcting the astigmatism of the image capturing lens system.

The fourth lens element with negative refractive power has an object-side surface being convex in a paraxial region thereof and an image-side surface being concave in a paraxial region thereof, wherein the image-side surface of the fourth lens element includes at least one convex shape in an off-axis region thereof. Therefore, the principal point of the image capturing lens system can be shifted toward the object side so as to shorten the back focal length thereof. Furthermore, the incident angle of the off-axis field onto an image sensor can be corrected, and the resolution of the peripheral image can be enhanced.

When a maximum of axial distances between every two lens elements of the first lens element, the second lens element, the third lens element and the fourth lens element which are adjacent to each other is ATmax, and a minimum of the axial distances between every two lens elements of the first lens element, the second lens element, the third lens element and the fourth lens element which are adjacent to each other is ATmin, the following condition is satisfied: 1.0<ATmax/ATmin. Therefore, the axial distances between every two lens elements of the image capturing lens system can be effectively controlled, which is favorable for assembling the image capturing lens system. Specifically, when an axial distance between the first lens element and the second lens element is T12, an axial distance between the second lens element and the third lens element is T23, and an axial distance between the third lens element and the fourth lens element is T34, the maximum of T12, T23 and T34 is ATmax, and the minimum of T12, T23 and T34 is ATmin. Preferably, the following condition can be satisfied: 1.0<ATmax/ATmin<8.0. More preferably, the following condition can be satisfied: 1.25<ATmax/ATmin<7.0. Further preferably, the following condition can be satisfied: 1.25<ATmax/ATmin<5.0.

When a curvature radius of the object-side surface of the third lens element is R5, and a curvature radius of the image-side surface of the third lens element is R6, the following condition can be satisfied: 1.0<(R5+R6)/(R5−R6)<3.50. Therefore, the shape of the third lens element can be effectively controlled, which is favorable for molding the third lens element, and the failure molding and stress due to an excessive curvature of the third lens element can be prevented. Preferably, the following condition can be satisfied: 1.0<(R5+R6)/(R5−R6)<2.0.

When the axial distance between the first lens element and the second lens element is T12, the axial distance between the second lens element and the third lens element is T23, and the axial distance between the third lens element and the fourth lens element is T34, the following condition can be satisfied: T34<T12<T23. Therefore, the space between every two lens elements of the image capturing lens system can be balanced, which is favorable for assembling the image capturing lens system.

When the axial distance between the second lens element and the third lens element is T23, and a central thickness of the third lens element is CT3, the following condition can be satisfied: T23<CT3. Therefore, the thickness of the third lens element and the axial distance between the second lens element and the third lens element can be adjusted, which is favorable for the moldability and the homogeneity of the third lens element, and the assembling yield rate can be increased.

When a focal length of the first lens element is f1, and a focal length of the fourth lens element is f4, the following condition can be satisfied: |f4/f1|<0.85. Therefore, the distribution of the refractive power of the object side and the image side of the image capturing lens system can be balanced, so that the image capturing lens system can have a larger field of view.

When a focal length of the image capturing lens system is f, and a vertical distance between a maximum effective diameter on the image-side surface of the fourth lens element and an optical axis is Y42, the following condition can be satisfied: 1.0<f/Y42<1.40. Therefore, it can ensure that the image capturing lens system has a larger field of view while the total track length thereof being effectively controlled and the image height of the image capturing lens system being adequate.

When a half of a maximal field of view of the image capturing lens system is HFOV, the following condition can be satisfied: 0.78<tan(HFOV)<2.0. Therefore, the image capturing lens system can have a larger field of view, and the image capturing range can be widened.

When a maximum of refractive indexes of the first lens element, the second lens element, the third lens element and the fourth lens element is Nmax, the following condition can be satisfied: 1.65≤Nmax. Therefore, it is favorable for correcting aberrations of the image capturing lens system, and the image quality can be improved.

When the axial distance between the second lens element and the third lens element is T23, and a central thickness of the second lens element is CT2, the following condition can be satisfied: 0.80<T23/CT2<2.50. Therefore, it can ensure that there is enough space between the second lens element and the third lens element, which is favorable for assembling the image capturing lens system. Preferably, the following condition can be satisfied: 1.0<T23/CT2<2.0.

When the axial distance between the first lens element and the second lens element is T12, and the axial distance between the third lens element and the fourth lens element is T34, the following condition can be satisfied: 1.0<T12/T34<6.0. Therefore, the axial distance between every two lens elements can be properly adjusted, which is favorable for increasing the light receiving range of the image capturing lens system. Preferably, the following condition can be satisfied: 1.80<T12/T34<5.70.

When the focal length of the first lens element is f1 a focal length of the second lens element is f2, a focal length of the third lens element is f3, and the focal length of the fourth lens element is f4, the following conditions can be satisfied: |f3|<|f1|<|f2|; and |f4|<|f1|<|f2|. Therefore, the required refractive power of the image capturing lens system can be distributed by the third lens element and the fourth lens element, which can share the burden of the first lens element and the second lens element, so that a higher sensitivity of the lens elements in the front end (i.e., the lens elements near the object side) of the image capturing lens system can be reduced.

When the focal length of the first lens element is f1, the focal length of the second lens element is f2, the focal length of the third lens element is f3, and the focal length of the fourth lens element is f4, the following condition can be satisfied: $(|f3|+|f4|)/(|f1|+|f2|)<0.65$. Therefore, the distribution of the refractive power of the lens elements of the image capturing lens system can be properly adjusted, so that the sensitivity of the image capturing lens system can be reduced.

When an f-number of the image capturing lens system is Fno, the following condition can be satisfied: $1.50<Fno<2.60$. Therefore, the size of the aperture stop is proper, which can ensure that the light rays entering into the image capturing lens system are sufficient, and the image brightness can be maintained.

When an Abbe number of the fourth lens element is V4, the following condition can be satisfied: $V4<30$. Therefore, the chromatic aberration can be corrected, and the overlap of images can be prevented.

When the axial distance between the first lens element and the second lens element is T12, and the axial distance between the second lens element and the third lens element is T23, the following condition can be satisfied: $0.70<T12/T23<2.0$. Therefore, the space distribution of the image capturing lens system can be effectively balanced, which is favorable for assembling the image capturing lens system.

When the focal length of the image capturing lens system is f, and the focal length of the second lens element is f2, the following condition can be satisfied: $f2/f<-3.25$. Therefore, the refractive power of the second lens element can be effectively adjusted, which is favorable for the image capturing lens system to receive the light rays of the larger field of view.

When a ratio of the focal length of the image capturing lens system and the focal length of the first lens element is P1 (i.e., P1=f/f1), a ratio of the focal length of the image capturing lens system and the focal length of the second lens element is P2 (i.e., P2=f/f2), a ratio of the focal length of the image capturing lens system and the focal length of the third lens element is P3 (i.e., P3=f/f3), and a ratio of the focal length of the image capturing lens system and the focal length of the fourth lens element is P4 (i.e., P4=f/f4), the following condition can be satisfied: $1.50<(|P3|+|P4|)/(|P1|+|P2|)<9.0$. Therefore, the image capturing lens system is featured with wide angle, and has a larger photographing range.

When an axial distance between the object-side surface of the first lens element and an image surface is TL, and the vertical distance between a maximum effective diameter on the image-side surface of the fourth lens element and the optical axis is Y42, the following condition can be satisfied: $TL/Y42<2.0$. Therefore, a short total track length of the image capturing lens system can be maintained, and can ensure that the field of view of the image capturing lens system is sufficient.

According to the image capturing lens system of the present disclosure, the lens elements thereof can be made of a plastic or a glass material. When the lens elements are made of a plastic material, the manufacturing cost can be effectively reduced. When the lens elements are made of a glass material, the distribution of the refractive powers of the image capturing lens system may be more flexible to design. Furthermore, surfaces of each lens element can be arranged to be aspheric (ASP), since the aspheric surface of the lens element is easy to form a shape other than spherical surface so as to have more controllable variables for eliminating aberrations thereof, and to further decrease the required number of the lens elements. Therefore, the total track length of the image capturing lens system can also be reduced.

According to the image capturing lens system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, if not stated otherwise, when the lens element has a convex surface, it indicates that the surface is convex in the paraxial region thereof; when the lens element has a concave surface, it indicates that the surface is concave in the paraxial region thereof. According to the image capturing lens system of the present disclosure, the positive refractive power or the negative refractive power of a lens element or the focal length of the lens element, that is, may refer to the refractive power or the focal length in the paraxial region of the lens element.

According to the image capturing lens system of the present disclosure, the image surface of the image capturing lens system, based on the corresponding image sensor, can be flat or curved. In particular, the image surface can be a curved surface being concave facing towards the object side.

According to the image capturing lens system of the present disclosure, the image capturing lens system can include at least one stop, such as an aperture stop, a glare stop or a field stop. Said glare stop or said field stop is for eliminating the stray light and thereby improving the image resolution thereof.

According to the image capturing lens system of the present disclosure, an aperture stop can be configured as a front stop or a middle stop. The front stop disposed between an imaged object and the first lens element can provide a longer distance from an exit pupil of the image capturing lens system to the image surface and thereby improves the image-sensing efficiency of an image sensor. A middle stop disposed between the first lens element and the image surface is favorable for enlarging the field of view of the image capturing lens system and thereby provides a wider field of view for the same.

According to the image capturing lens system of the present disclosure, the image capturing lens system can be optionally applied to moving focus optical systems, and is featured with good ability for correcting aberrations and high image quality. The image capturing lens system of the present disclosure also can be applied to 3D (three-dimensional) image capturing applications, in products such as digital cameras, mobile devices, digital tablets, smart TV, surveillance devices, game consoles with motion sensing function, driving recording systems, rear view camera systems, and wearable devices.

According to the present disclosure, an image capturing apparatus is provided. The image capturing apparatus includes the aforementioned image capturing lens system and an image sensor, wherein the image sensor is disposed at the image side of the aforementioned image capturing lens system, that is, the image sensor can be disposed on or near the image surface of the aforementioned image capturing lens system. In the image capturing lens system, with the distribution of the refractive power and the surface shape of the first lens element, the second lens element, the third lens element and the fourth lens element, the image capturing apparatus has a compact size and a larger field of view at the same time. Preferably, the image capturing apparatus can further include a barrel member, a holding member or a combination thereof.

According to the present disclosure, an electronic device is provided. The electronic device includes the aforementioned image capturing apparatus. Therefore, the electronic device has a compact size and a larger field of view at the same time. Preferably, the electronic device can further include but not limited to a control unit, a display, a storage unit, a random access memory unit (RAM), a read only memory unit (ROM) or a combination thereof.

According to the above description of the present disclosure, the following 1st-14th specific embodiments are provided for further explanation.

1st Embodiment

Figure 2:
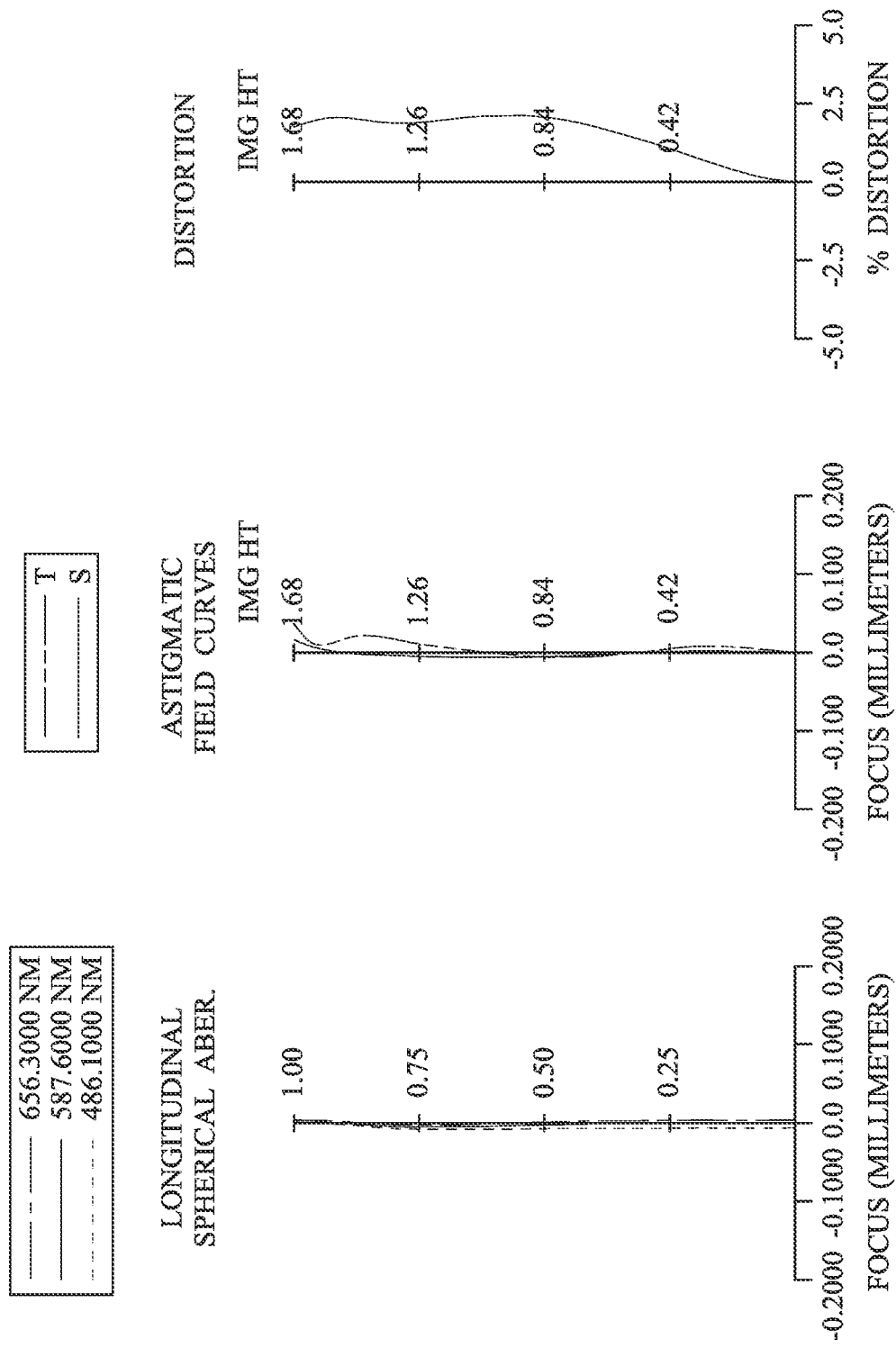
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows spherical aberration curves, astigmatic field curves and a distortion curve of the image capturing apparatus according to the 1st embodiment. In FIG. 1, the image capturing apparatus includes an image capturing lens system (its reference numeral is omitted) and an image sensor 170. The image capturing lens system includes, in order from an object side to an image side, an aperture stop 100, a first lens element 110, a second lens element 120, a third lens element 130, a fourth lens element 140, an IR-cut filter 150 and an image surface 160, wherein the image sensor 170 is disposed on the image surface 160 of the image capturing lens system. The image capturing lens system has a total of four lens elements (110-140).

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with negative refractive power has an object-side surface 121 being concave in a paraxial region thereof and an image-side surface 122 being convex in a paraxial region thereof. The second lens element 120 is made of a plastic material, and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of a plastic material, and has the object-side surface 141 and the image-side surface 142 being both aspheric. Furthermore, the image-side surface 142 of the fourth lens element 140 includes at least one convex shape in an off-axis region thereof.

The IR-cut filter 150 is made of a glass material and located between the fourth lens element 140 and the image surface 160, and will not affect the focal length of the image capturing lens system.

The equation of the aspheric surface profiles of the aforementioned lens elements of the 1st embodiment is expressed as follows:

$$X(Y) = (Y^2/R)/(1 + \text{sqrt}(1 - (1 + k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing lens system according to the 1st embodiment, when a focal length of the image capturing lens system is f, an f-number of the image capturing lens system is Fno, and half of a maximal field of view of the image capturing lens system is HFOV, these parameters have the following values: f=2.59 mm; Fno=2.40; and HFOV=32.5 degrees.

In the image capturing lens system according to the 1st embodiment, when half of the maximal field of view of the image capturing lens system is HFOV, the following condition is satisfied: tan(HFOV)=0.64.

In the image capturing lens system according to the 1st embodiment, when an Abbe number of the fourth lens element 140 is V4, the following condition is satisfied: V4=56.0.

In the image capturing lens system according to the 1st embodiment, when a maximum of refractive indexes of the first lens element 110, the second lens element 120, the third lens element 130 and the fourth lens element 140 is Nmax, the following condition is satisfied: Nmax=1.660.

In the image capturing lens system according to the 1st embodiment, when an axial distance between the first lens element 110 and the second lens element 120 is T12, an axial distance between the second lens element 120 and the third lens element 130 is T23, and an axial distance between the third lens element 130 and the fourth lens element 140 is T34, the following conditions are satisfied: T12/T23=0.86; and T12/T34=3.69.

In the image capturing lens system according to the 1st embodiment, when the axial distance between the second lens element 120 and the third lens element 130 is T23, and a central thickness of the second lens element 120 is CT2, the following condition is satisfied: T23/CT2=1.24.

In the image capturing lens system according to the 1st embodiment, when a maximum of the axial distances between every two lens elements of the first lens element 110, the second lens element 120, the third lens element 130 and the fourth lens element 140 which are adjacent to each other is ATmax, and a minimum of the axial distances between every two lens elements of the first lens element 110, the second lens element 120, the third lens element 130 and the fourth lens element 140 which are adjacent to each other is ATmin, the following condition is satisfied: ATmax/ATmin=4.32.

In the image capturing lens system according to the 1st embodiment, when a curvature radius of the object-side surface 131 of the third lens element 130 is R5, a curvature radius of the image-side surface 132 of the third lens element 130 is R6, the following condition is satisfied: (R5+R6)/(R5−R6)=1.25.

In the image capturing lens system according to the 1st embodiment, when a focal length of the first lens element 110 is f1, and a focal length of the fourth lens element 140 is f4, the following condition is satisfied: |f4/f1|=0.67.

In the image capturing lens system according to the 1st embodiment, when the focal length of the image capturing lens system is f, and a focal length of the second lens element 120 is f2, the following condition is satisfied: f2/f=−1.41.

Figure 23:
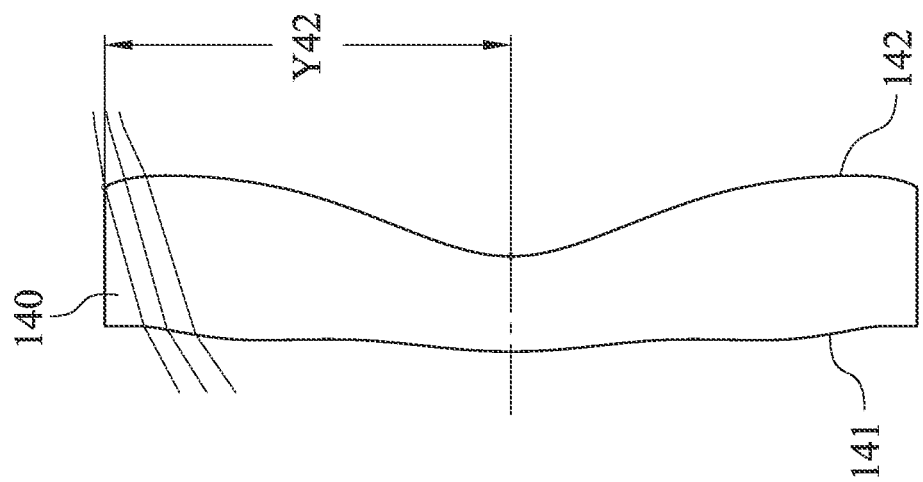
FIG. 23 shows a schematic view of the parameter Y42 of a fourth lens element according to the 1st embodiment.

FIG. 23 shows a schematic view of a parameter Y42 of the fourth lens element 140 according to the 1st embodiment. When a vertical distance between a maximum effective diameter on the image-side surface 142 of the fourth lens element 140 and an optical axis is Y42, the focal length of the image capturing lens system is f, and an axial distance between the object-side surface 111 of the first lens element 110 and the image surface 160 is TL, the following conditions are satisfied: f/Y42=1.64; and TL/Y42=2.26.

In the image capturing lens system according to the 1st embodiment, when the focal length of the first lens element 110 is f1, the focal length of the second lens element 120 is f2, a focal length of the third lens element 130 is f3, and the focal length of the fourth lens element 140 is f4, the following condition is satisfied: (|f3|+|f4|)/(|f1|+|f2|)=0.51.

In the image capturing lens system according to the 1st embodiment, when a ratio of the focal length of the image capturing lens system and the focal length of the first lens element 110 is P1, a ratio of the focal length of the image capturing lens system and the focal length of the second lens element 120 is P2, a ratio of the focal length of the image capturing lens system and the focal length of the third lens element 130 is P3, and a ratio of the focal length of the image capturing lens system and the focal length of the fourth lens element 140 is P4, the following condition is satisfied: (|P3|+|P4|)/(|P1|+|P2|)=1.91.

In the image capturing lens system according to the 1st embodiment, when the axial distance between the first lens element 110 and the second lens element 120 is T12, the axial distance between the second lens element 120 and the third lens element 130 is T23, and the axial distance between the third lens element 130 and the fourth lens element 140 is T34, the following condition is satisfied: T34<T12<T23.

In the image capturing lens system according to the 1st embodiment, when the axial distance between the second lens element 120 and the third lens element 130 is T23, and a central thickness of the third lens element 130 is CT3, the following condition is satisfied: T23<CT3.

In the image capturing lens system according to the 1st embodiment, when the focal length of the first lens element 110 is f1, the focal length of the second lens element 120 is f2, the focal length of the third lens element 130 is f3, and the focal length of the fourth lens element 140 is f4, the following conditions are satisfied: |f3|<|f1|<|f2|; and |f4|<|f1|<|f2|.

The detailed optical data of the 1st embodiment are shown in Table 1 and the aspheric surface data are shown in Table 2 below.

TABLE 1

1st Embodiment
f = 2.59 mm, Fno = 2.40, HFOV = 32.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.111 | | | | |
| 2 | Lens 1 | 1.227 | ASP | 0.405 | Plastic | 1.544 | 56.0 | 2.58 |
| 3 | | 8.624 | ASP | 0.384 | | | | |
| 4 | Lens 2 | −1.904 | ASP | 0.363 | Plastic | 1.660 | 20.4 | −3.66 |
| 5 | | −9.680 | ASP | 0.449 | | | | |
| 6 | Lens 3 | −6.610 | ASP | 0.507 | Plastic | 1.544 | 56.0 | 1.46 |
| 7 | | −0.728 | ASP | 0.104 | | | | |
| 8 | Lens 4 | 2.037 | ASP | 0.370 | Plastic | 1.544 | 56.0 | −1.74 |
| 9 | | 0.605 | ASP | 0.500 | | | | |
| 10 | IR-cut filter | Plano | | 0.210 | Glass | 1.517 | 64.2 | — |
| 11 | | Plano | | 0.272 | | | | |
| 12 | Image | Plano | | — | | | | |

Note:
Reference wavelength is 587.6 nm (d-line).

TABLE 2

Aspheric Coefficients

| Surface # | 2 | 3 | 4 | 5 |
|---|---|---|---|---|
| k = | −5.6977E−01 | −9.0000E+01 | 5.1726E+00 | −4.8144E+00 |
| A4 = | 4.0621E−02 | −5.9461E−02 | −2.3752E−01 | −1.4837E−01 |
| A6 = | 2.7381E−02 | −2.4539E−01 | −2.8608E−01 | 5.1023E−02 |
| A8 = | −6.1802E−02 | −4.3001E−02 | 4.2319E−01 | −6.0251E−01 |
| A10 = | −5.9164E−01 | −1.0261E+00 | −4.3566E+00 | 1.1833E+00 |
| A12 = | | | 8.9928E+00 | −1.0829E+00 |
| A14 = | | | | 8.5499E−01 |

TABLE 2-continued

| Aspheric Coefficients | | | | |
|---|---|---|---|---|
| Surface # | 6 | 7 | 8 | 9 |
| k = | 3.7536E+01 | −4.0602E+00 | −9.5031E+00 | −3.7613E+00 |
| A4 = | 1.3680E−01 | −2.4100E−01 | −2.6306E−01 | −2.4718E−01 |
| A6 = | −3.2035E−01 | 3.9719E−01 | −2.0486E−02 | 1.8698E−01 |
| A8 = | 3.8645E−01 | −7.8259E−01 | 3.9583E−01 | −1.1059E−01 |
| A10 = | −1.6415E−01 | 1.4077E+00 | −3.8489E−01 | 4.3786E−02 |
| A12 = | −1.7047E−01 | −1.2771E+00 | 1.7578E−01 | −6.7643E−03 |
| A14 = | 1.1964E−01 | 5.2563E−01 | −4.0892E−02 | −1.0230E−03 |
| A16 = | | −7.8926E−02 | 3.8279E−03 | 2.9616E−04 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
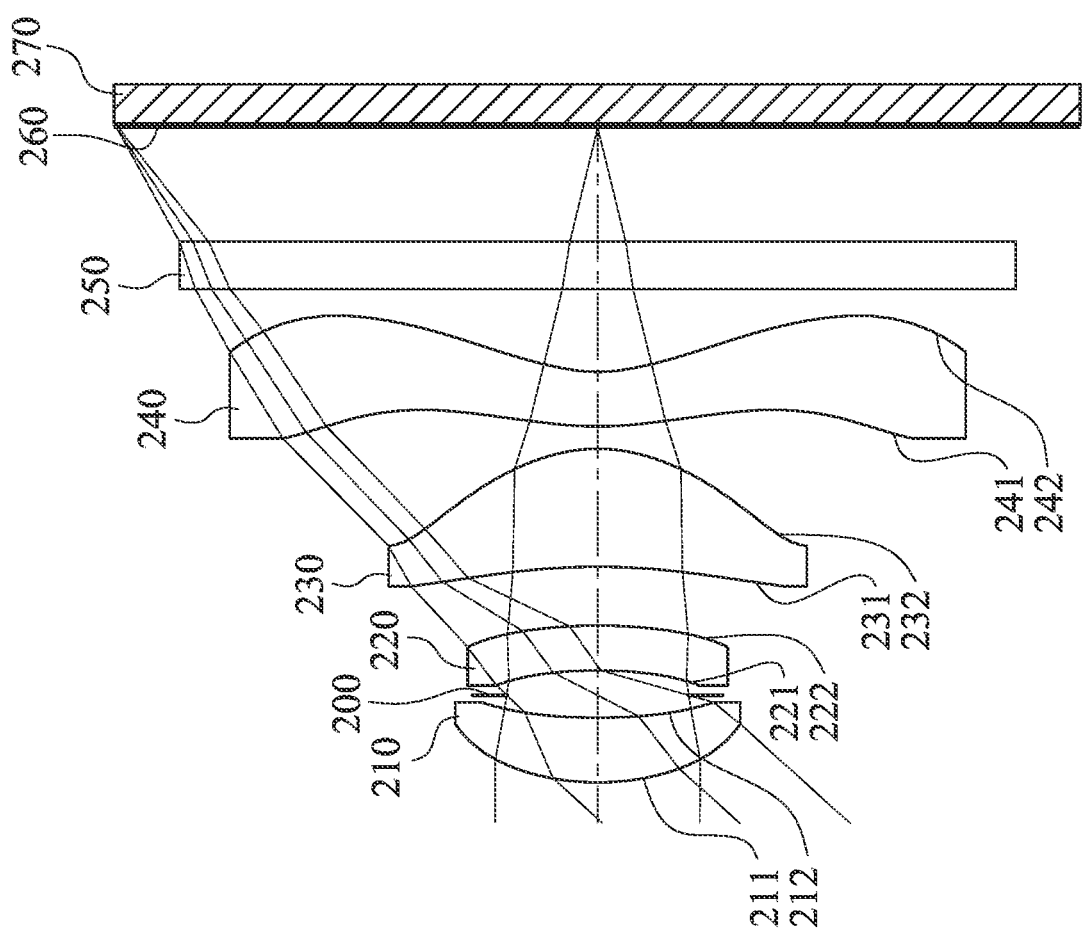
FIG. 3 is a schematic view of an image capturing apparatus according to the 2nd embodiment of the present disclosure.
Figure 4:
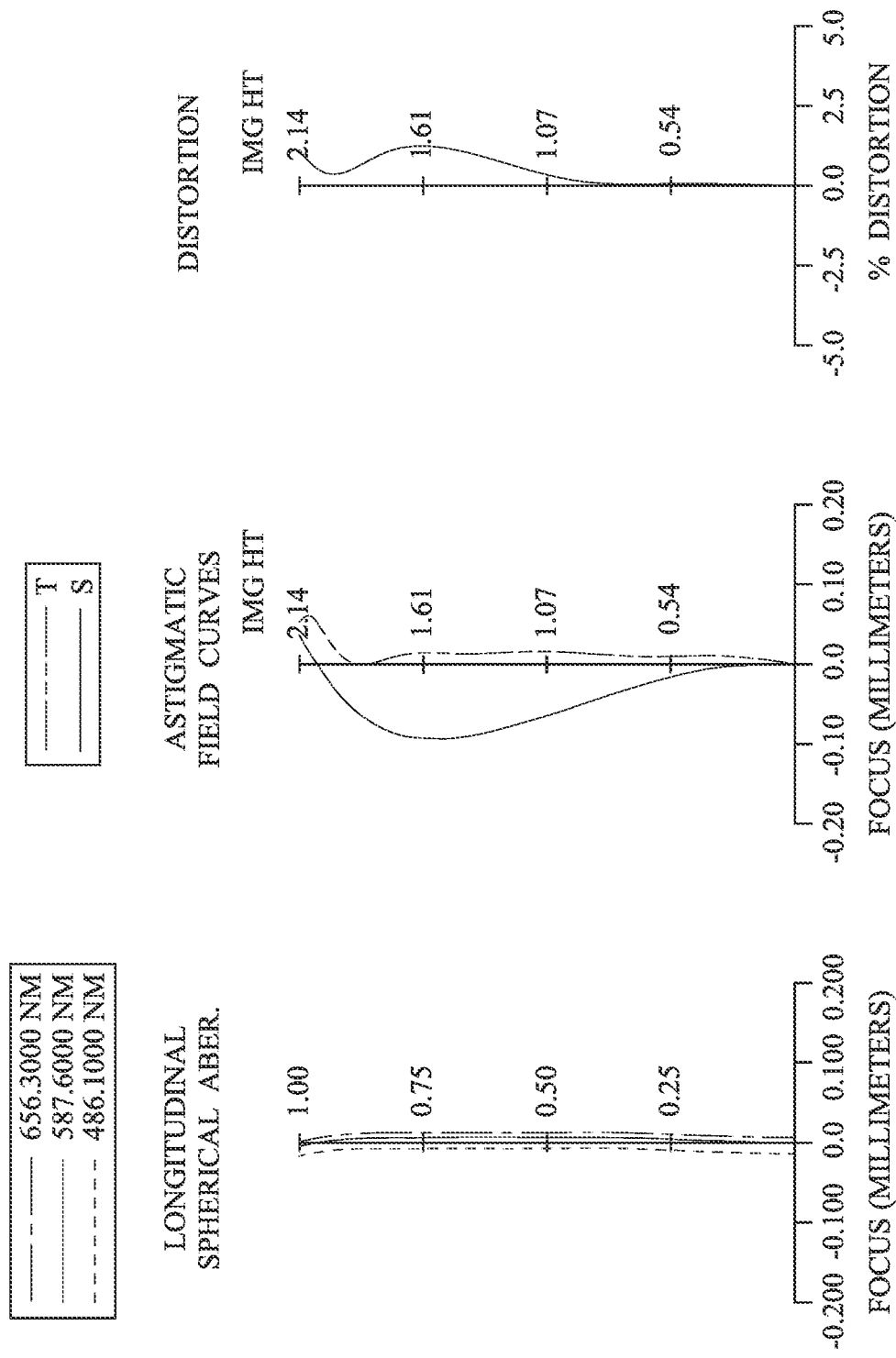
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows spherical aberration curves, astigmatic field curves and a distortion curve of the image capturing apparatus according to the 2nd embodiment. In FIG. 3, the image capturing apparatus includes an image capturing lens system (its reference numeral is omitted) and an image sensor 270. The image capturing lens system includes, in order from an object side to an image side, a first lens element 210, an aperture stop 200, a second lens element 220, a third lens element 230, a fourth lens element 240, an IR-cut filter 250 and an image surface 260, wherein the image sensor 270 is disposed on the image surface 260 of the image capturing lens system. The image capturing lens system has a total of four lens elements (210-240).

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with negative refractive power has an object-side surface 221 being concave in a paraxial region thereof and an image-side surface 222 being convex in a paraxial region thereof. The second lens element 220 is made of a plastic material, and has the object-side surface 221 and the image-side surface 222 being both aspheric.

The third lens element 230 with positive refractive power has an object-side surface 231 being concave in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of a plastic material, and has the object-side surface 241 and the image-side surface 242 being both aspheric. Furthermore, the image-side surface 242 of the fourth lens element 240 includes at least one convex shape in an off-axis region thereof.

The IR-cut filter 250 is made of a glass material and located between the fourth lens element 240 and the image surface 260, and will not affect the focal length of the image capturing lens system.

The detailed optical data of the 2nd embodiment are shown in Table 3 and the aspheric surface data are shown in Table 4 below.

TABLE 3

2nd Embodiment
f = 1.91 mm, Fno = 2.10, HFOV = 47.9 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Lens 1 | 1.147 | ASP | 0.288 | Plastic | 1.544 | 56.0 | 3.48 |
| 2 | | 2.650 | ASP | 0.100 | | | | |
| 3 | Ape. Stop | Plano | | 0.111 | | | | |
| 4 | Lens 2 | −1.986 | ASP | 0.200 | Plastic | 1.660 | 20.4 | −38.29 |
| 5 | | −2.242 | ASP | 0.261 | | | | |
| 6 | Lens 3 | −3.226 | ASP | 0.526 | Plastic | 1.544 | 56.0 | 1.59 |
| 7 | | −0.722 | ASP | 0.100 | | | | |
| 8 | Lens 4 | 1.532 | ASP | 0.243 | Plastic | 1.607 | 26.6 | −2.81 |
| 9 | | 0.759 | ASP | 0.369 | | | | |
| 10 | IR-cut filter | Plano | | 0.210 | Glass | 1.517 | 64.2 | — |
| 11 | | Plano | | 0.519 | | | | |
| 12 | Image | Plano | | — | | | | |

Note:
Reference wavelength is 587.6 nm (d-line).

TABLE 4

| Aspheric Coefficients | | | | |
|---|---|---|---|---|
| Surface # | 1 | 2 | 4 | 5 |
| k = | 7.3181E−02 | −1.6175E+01 | 7.3545E−01 | 3.7527E+00 |
| A4 = | 8.4949E−02 | 3.1858E−01 | −1.7960E−01 | 2.7845E−04 |
| A6 = | 5.4600E−01 | −2.5493E−01 | −3.7075E−01 | 3.0845E−02 |
| A8 = | −5.4919E−01 | 5.1973E+00 | −1.8684E+00 | −1.0466E+00 |
| A10 = | 1.5337E+00 | −1.9824E+01 | 1.6290E−01 | 4.5747E−01 |
| A12 = | 3.7983E+00 | 2.0017E+01 | −1.5044E+01 | −6.8798E+00 |
| A14 = | | | | 1.0175E+01 |

| Surface # | 6 | 7 | 8 | 9 |
|---|---|---|---|---|
| k = | 4.8684E+00 | −1.3457E+00 | −2.6658E+01 | −6.3949E+00 |
| A4 = | 3.2333E−02 | 1.6983E−01 | −3.5143E−02 | −9.1797E−02 |
| A6 = | −6.6362E−02 | −4.4846E−01 | −1.6945E−01 | 3.6336E−02 |
| A8 = | 3.3135E−01 | 3.0440E−01 | 2.0821E−01 | −3.3242E−02 |
| A10 = | −9.2498E−02 | −2.1863E−02 | −1.4489E−01 | 2.4893E−02 |
| A12 = | −2.9933E−01 | 4.6412E−01 | 6.0505E−02 | −1.1868E−02 |
| A14 = | 1.5854E−01 | 2.5195E−02 | −1.1819E−02 | 2.8423E−03 |
| A16 = | | −3.2318E−01 | 6.2592E−04 | −2.5541E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.91 | ATmax/ATmin | 2.61 |
| Fno | 2.10 | (R5 + R6)/(R5 − R6) | 1.58 |
| HFOV [deg.] | 47.9 | \|f4/f1\| | 0.81 |
| tan(HFOV) | 1.11 | f2/f | −20.09 |
| V4 | 26.6 | f/Y42 | 1.16 |
| Nmax | 1.660 | TL/Y42 | 1.79 |
| T12/T23 | 0.81 | (\|f3\| + \|f4\|)/(\|f1\| + \|f2\|) | 0.11 |
| T12/T34 | 2.11 | (\|P3\| + \|P4\|)/(\|P1\| + \|P2\|) | 3.14 |
| T23/CT2 | 1.31 | | |

In the image capturing lens system according to the 2nd embodiment, when an axial distance between the first lens element 210 and the second lens element 220 is T12, an axial distance between the second lens element 220 and the third lens element 230 is T23, and an axial distance between the third lens element 230 and the fourth lens element 240 is T34, the following condition is satisfied: T34<T12<T23.

In the image capturing lens system according to the 2nd embodiment, when the axial distance between the second lens element 220 and the third lens element 230 is T23, and a central thickness of the third lens element 230 is CT3, the following condition is satisfied: T23<CT3.

In the image capturing lens system according to the 2nd embodiment, when a focal length of the first lens element 210 is f1, a focal length of the second lens element 220 is f2, a focal length of the third lens element 230 is f3, and a focal length of the fourth lens element 240 is f4, the following conditions are satisfied: |f3|<|f1|<|f2|; and |f4|<|f1|<|f2|.

3rd Embodiment

Figure 5:
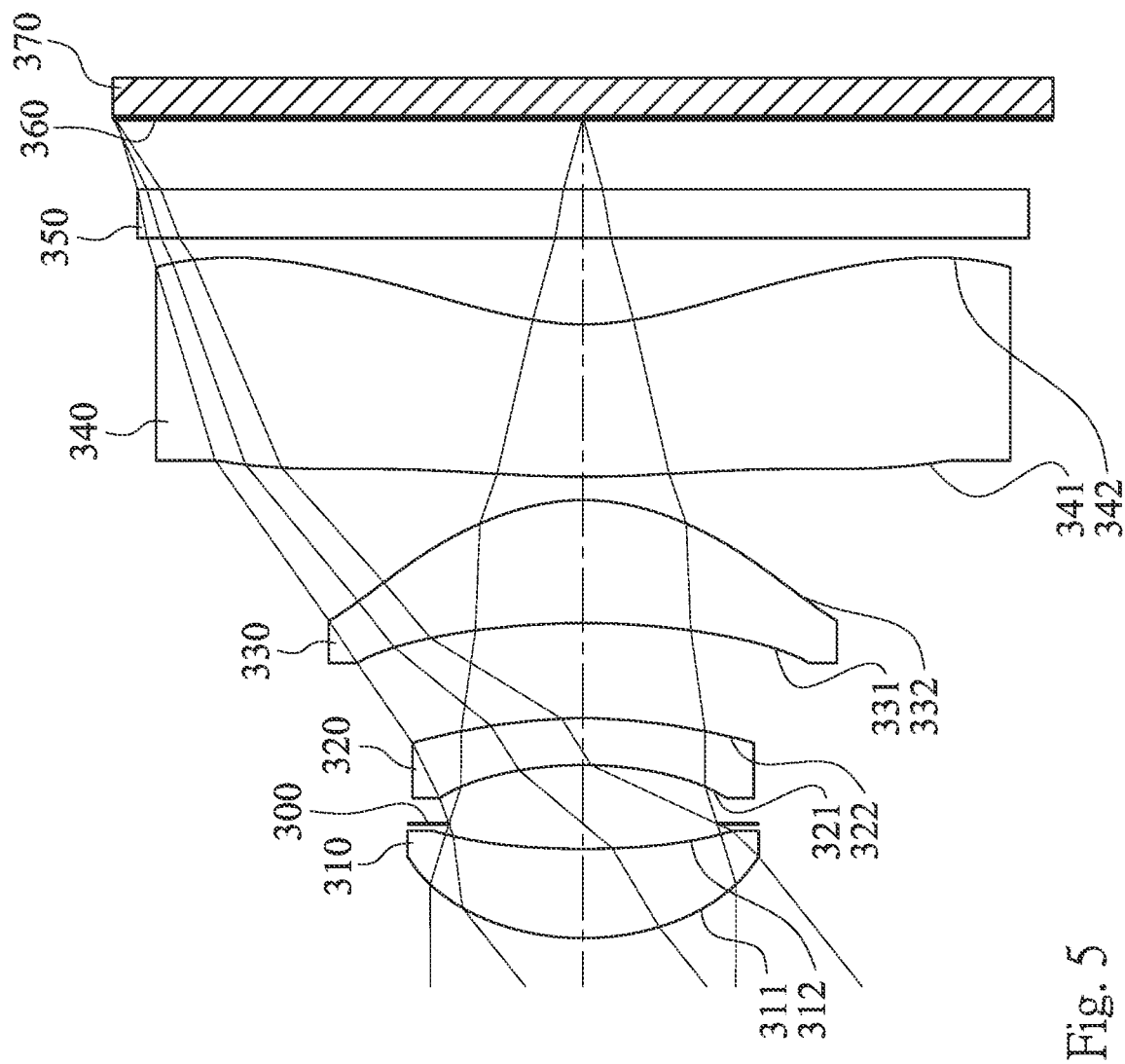
FIG. 5 is a schematic view of an image capturing apparatus according to the 3rd embodiment of the present disclosure.
Figure 6:
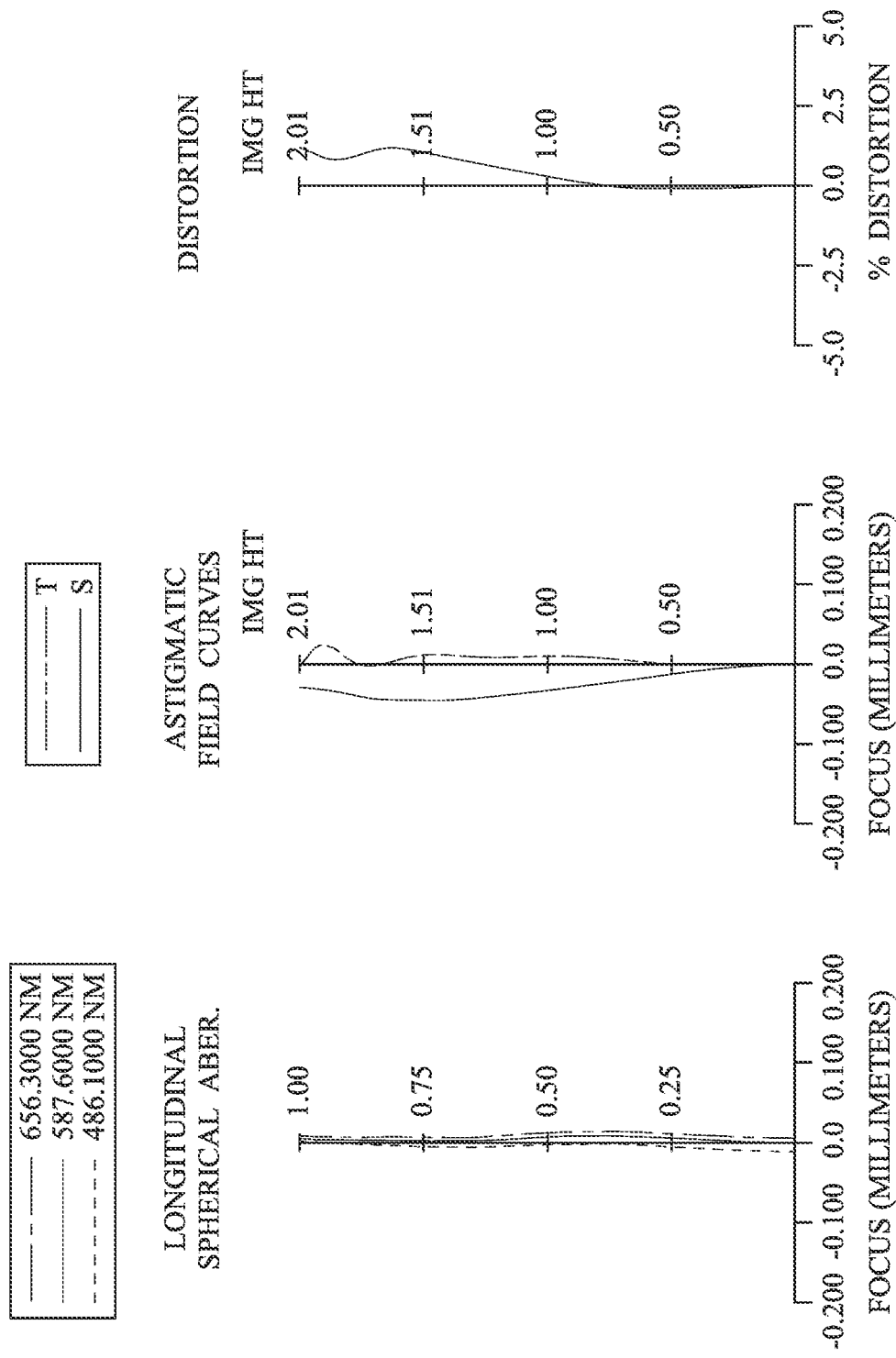
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows spherical aberration curves, astigmatic field curves and a distortion curve of the image capturing apparatus according to the 3rd embodiment. In FIG. 5, the image capturing apparatus includes an image capturing lens system (its reference numeral is omitted) and an image sensor 370. The image capturing lens system includes, in order from an object side to an image side, a first lens element 310, an aperture stop 300, a second lens element 320, a third lens element 330, a fourth lens element 340, an IR-cut filter 350 and an image surface 360, wherein the image sensor 370 is disposed on the image surface 360 of the image capturing lens system. The image capturing lens system has a total of four lens elements (310-340).

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with negative refractive power has an object-side surface 321 being concave in a paraxial region thereof and an image-side surface 322 being convex in a paraxial region thereof. The second lens element 320 is made of a plastic material, and has the object-side surface 321 and the image-side surface 322 being both aspheric.

The third lens element 330 with positive refractive power has an object-side surface 331 being concave in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric. Furthermore, the image-side surface 342 of the fourth lens element 340 includes at least one convex shape in an off-axis region thereof.

The IR-cut filter 350 is made of a glass material and located between the fourth lens element 340 and the image surface 360, and will not affect the focal length of the image capturing lens system.

The detailed optical data of the 3rd embodiment are shown in Table 5 and the aspheric surface data are shown in Table 6 below.

TABLE 5

3rd Embodiment
f = 2.47 mm, Fno = 1.90, HFOV = 38.6 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Lens 1 | 1.147 | ASP | 0.382 | Plastic | 1.544 | 56.0 | 2.95 |
| 2 | | 3.547 | ASP | 0.107 | | | | |
| 3 | Ape. Stop | Plano | | 0.252 | | | | |
| 4 | Lens 2 | −1.670 | ASP | 0.200 | Plastic | 1.660 | 20.4 | −10.29 |
| 5 | | −2.320 | ASP | 0.408 | | | | |
| 6 | Lens 3 | −3.226 | ASP | 0.526 | Plastic | 1.544 | 56.0 | 2.18 |
| 7 | | −0.916 | ASP | 0.100 | | | | |
| 8 | Lens 4 | 4.814 | ASP | 0.652 | Plastic | 1.607 | 26.6 | −2.72 |
| 9 | | 1.168 | ASP | 0.369 | | | | |
| 10 | IR-cut filter | Plano | | 0.210 | Glass | 1.517 | 64.2 | — |
| 11 | | Plano | | 0.304 | | | | |
| 12 | Image | Plano | | — | | | | |

Note:
Reference wavelength is 587.6 nm (d-line).

TABLE 6

Aspheric Coefficients

| Surface # | 1 | 2 | 4 | 5 |
|---|---|---|---|---|
| k = | −2.7180E−01 | −6.8242E+01 | −2.0495E+00 | −2.2950E+00 |
| A4 = | 6.1673E−02 | 2.7534E−01 | −9.8943E−02 | 6.7612E−02 |
| A6 = | 2.5711E−01 | −3.9659E−01 | −1.7631E−01 | −1.0368E−01 |
| A8 = | −2.2368E−01 | 8.9401E−01 | −5.4891E−01 | −1.7195E−01 |
| A10 = | 9.4560E−02 | −3.1620E−01 | 2.4038E+00 | 1.6775E+00 |
| A12 = | 9.8382E−01 | −1.0654E+00 | −6.0692E+00 | −4.7409E+00 |
| A14 = | | | | 4.4019E+00 |

| Surface # | 6 | 7 | 8 | 9 |
|---|---|---|---|---|
| k = | 6.2676E+00 | −1.1497E+00 | −9.0000E+01 | −6.7673E+00 |
| A4 = | 8.7523E−02 | 1.7602E−01 | −1.0160E−03 | −5.7649E−02 |
| A6 = | −1.7860E−01 | −3.3152E−01 | −1.4806E−01 | 3.1456E−02 |
| A8 = | 1.7397E−01 | 3.3316E−01 | 2.2228E−01 | −3.1985E−02 |
| A10 = | −4.3974E−02 | −2.2071E−01 | −1.5172E−01 | 2.6042E−02 |
| A12 = | −1.1049E−02 | 1.8278E−01 | 5.6411E−02 | −1.1909E−02 |
| A14 = | −2.2318E−02 | −9.2402E−02 | −1.0921E−02 | 2.6827E−03 |
| A16 = | | 1.4922E−02 | 8.4893E−04 | −2.3374E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.47 | ATmax/ATmin | 4.08 |
| Fno | 1.90 | (R5 + R6)/(R5 − R6) | 1.79 |
| HFOV [deg.] | 38.6 | \|f4/f1\| | 0.92 |
| tan(HFOV) | 0.80 | f2/f | −4.17 |
| V4 | 26.6 | f/Y42 | 1.35 |
| Nmax | 1.660 | TL/Y42 | 1.92 |
| T12/T23 | 0.88 | (\|f3\| + \|f4\|)/(\|f1\| + \|f2\|) | 0.37 |
| T12/T34 | 3.59 | (\|P3\| + \|P4\|)/(\|P1\| + \|P2\|) | 1.89 |
| T23/CT2 | 2.04 | | |

In the image capturing lens system according to the 3rd embodiment, when an axial distance between the first lens element 310 and the second lens element 320 is T12, an axial distance between the second lens element 320 and the third lens element 330 is T23, and an axial distance between the third lens element 330 and the fourth lens element 340 is T34, the following condition is satisfied: T34<T12<T23.

In the image capturing lens system according to the 3rd embodiment, when the axial distance between the second lens element 320 and the third lens element 330 is T23, and a central thickness of the third lens element 330 is is CT3, the following condition is satisfied: T23<CT3.

In the image capturing lens system according to the 3rd embodiment, when a focal length of the first lens element 310 is f1, a focal length of the second lens element 320 is f2, a focal length of the third lens element 330 is f3, and a focal length of the fourth lens element 340 is f4, the following conditions are satisfied: |f3|<|f1|<|f2|; and |f4|<|f1|<|f2|.

4th Embodiment

Figure 7:
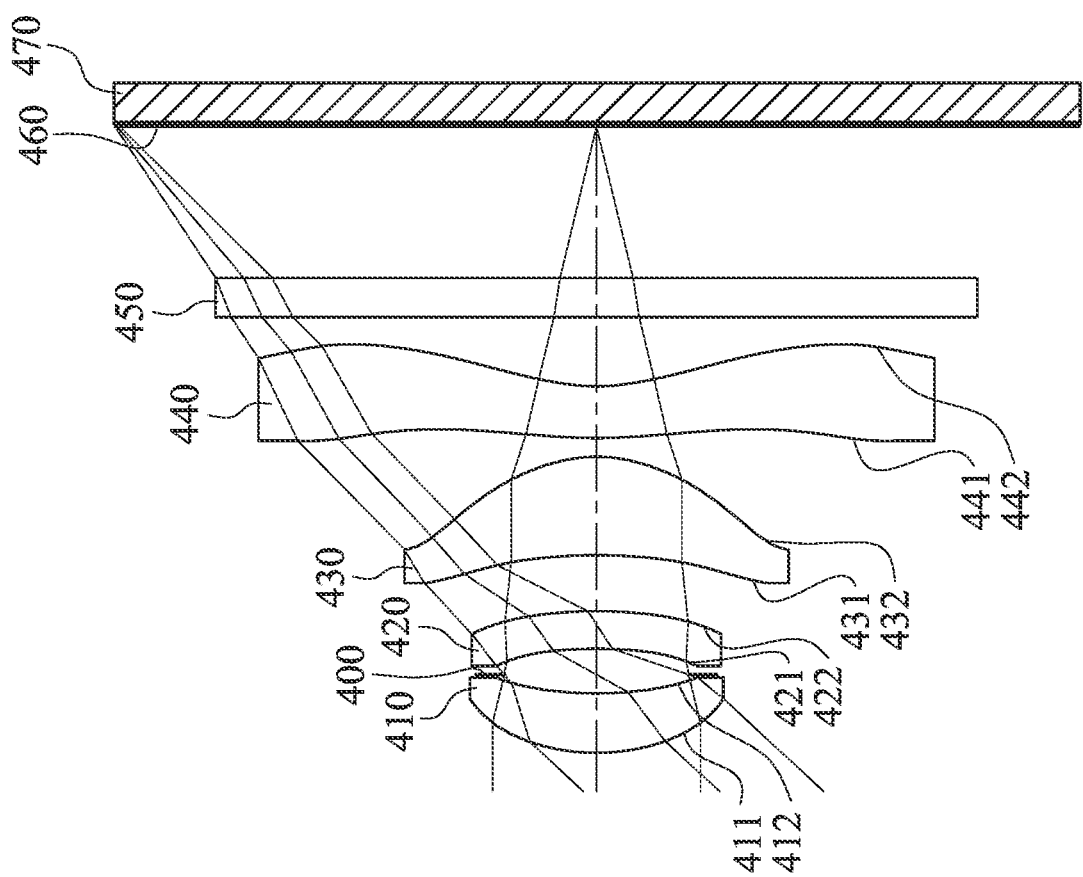
FIG. 7 is a schematic view of an image capturing apparatus according to the 4th embodiment of the present disclosure.
Figure 8:
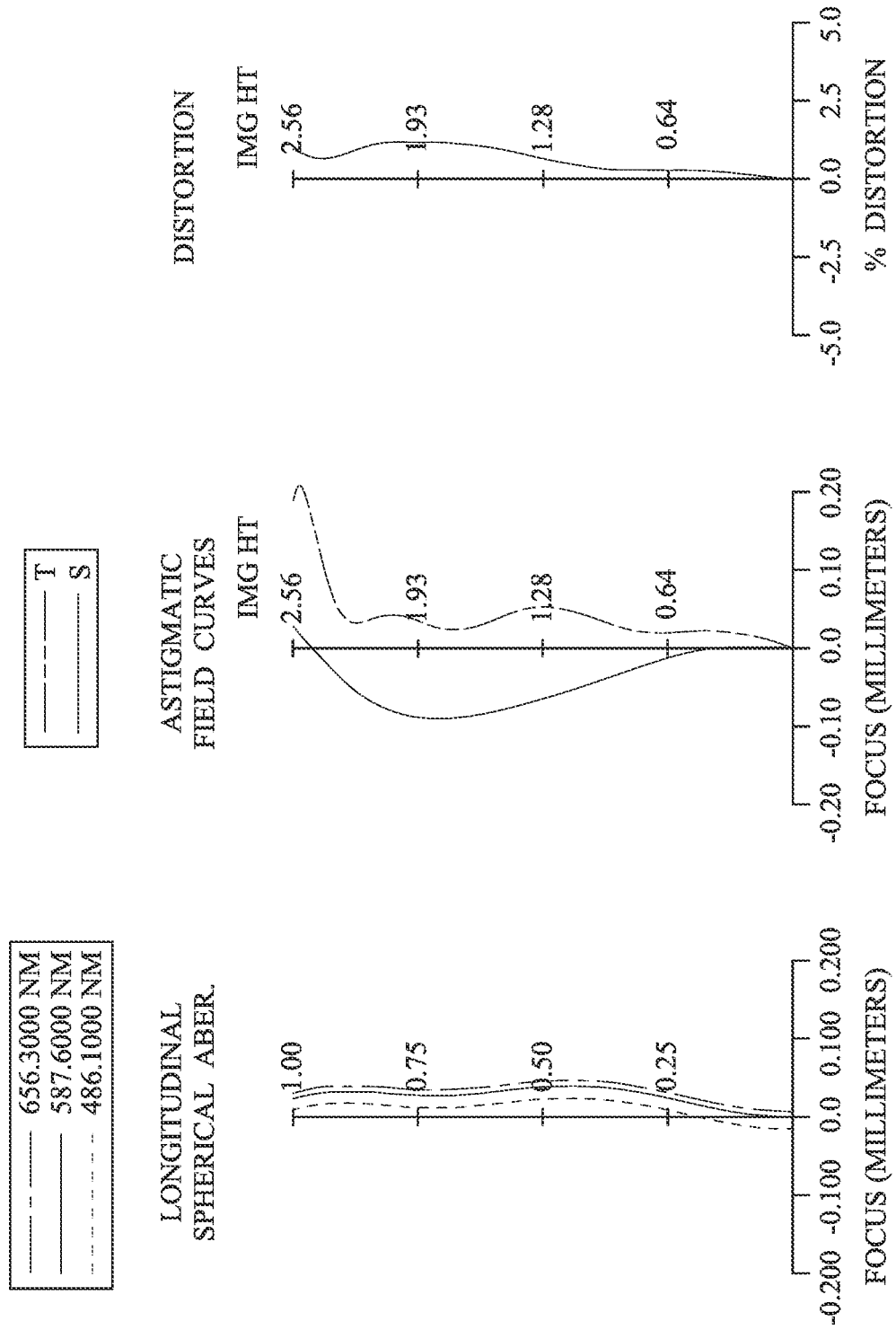
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows spherical aberration curves, astigmatic field curves and a distortion curve of the image capturing apparatus according to the 4th embodiment. In FIG. 7, the image capturing apparatus includes an image capturing lens system (its reference numeral is omitted) and an image sensor 470. The image capturing lens system includes, in order from an object side to an image side, a first lens element 410, an aperture stop 400, a second lens element 420, a third lens element 430, a fourth lens element 440, an IR-cut filter 450 and an image surface 460, wherein the image sensor 470 is disposed on the image surface 460 of the image capturing lens system. The image capturing lens system has a total of four lens elements (410-440).

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with negative refractive power has an object-side surface 421 being concave in a paraxial region thereof and an image-side surface 422 being convex in a paraxial region thereof. The second lens element 420 is made of a plastic material, and has the object-side surface 421 and the image-side surface 422 being both aspheric.

The third lens element 430 with positive refractive power has an object-side surface 431 being concave in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric. Furthermore, the image-side surface 442 of the fourth lens element 440 includes at least one convex shape in an off-axis region thereof.

The IR-cut filter 450 is made of a glass material and located between the fourth lens element 440 and the image surface 460, and will not affect the focal length of the image capturing lens system.

The detailed optical data of the 4th embodiment are shown in Table 7 and the aspheric surface data are shown in Table 8 below.

TABLE 7

4th Embodiment
f = 2.33 mm, Fno = 2.10, HFOV = 47.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.147 | ASP | 0.318 | Plastic | 1.544 | 56.0 | 3.98 |
| 2 | | 2.199 | ASP | 0.100 | | | | |
| 3 | Ape. Stop | Plano | | 0.139 | | | | |
| 4 | Lens 2 | -2.347 | ASP | 0.200 | Plastic | 1.660 | 20.4 | -46.83 |
| 5 | | -2.626 | ASP | 0.299 | | | | |
| 6 | Lens 3 | -3.182 | ASP | 0.526 | Plastic | 1.544 | 56.0 | 1.87 |
| 7 | | -0.815 | ASP | 0.100 | | | | |
| 8 | Lens 4 | 2.635 | ASP | 0.276 | Plastic | 1.607 | 26.6 | -3.15 |
| 9 | | 1.064 | ASP | 0.369 | | | | |
| 10 | IR-cut filter | Plano | | 0.210 | Glass | 1.517 | 64.2 | — |
| 11 | | Plano | | 0.821 | | | | |
| 12 | Image | Plano | | — | | | | |

Note:
Reference wavelength is 587.6 nm (d-line).

TABLE 8

Aspheric Coefficients

| Surface # | 1 | 2 | 4 | 5 |
|---|---|---|---|---|
| k = | -1.3811E-01 | -3.3560E+00 | 3.0062E+00 | 6.7394E+00 |
| A4 = | 5.3226E-02 | 2.7159E-01 | -2.2874E-01 | -1.1344E-01 |
| A6 = | 5.9767E-01 | -1.0941E+00 | -1.3919E-01 | 5.6693E-02 |
| A8 = | -8.7037E-01 | 7.4633E+00 | -1.0153E+00 | -2.2770E-01 |
| A10 = | 1.7958E-02 | -1.6055E+01 | 6.2843E+00 | 1.9680E+00 |
| A12 = | 4.6638E+00 | 8.4728E+00 | -2.2508E+01 | -7.4476E+00 |
| A14 = | | | | 7.1444E+00 |

| Surface # | 6 | 7 | 8 | 9 |
|---|---|---|---|---|
| k = | 9.5125E+00 | -1.0036E+00 | -8.2571E+01 | -9.0403E+00 |
| A4 = | -8.4583E-02 | 1.7193E-01 | 7.9393E-03 | -5.7720E-02 |
| A6 = | -6.2586E-02 | -3.4130E-01 | -1.5692E-01 | 2.7466E-02 |
| A8 = | 4.0153E-01 | 2.4412E-01 | 2.0693E-01 | -3.2114E-02 |
| A10 = | -3.7154E-02 | -1.7821E-01 | -1.4714E-01 | 2.5975E-02 |
| A12 = | -2.7143E-01 | 3.3867E-01 | 5.9182E-02 | -1.1824E-02 |
| A14 = | 1.7710E-01 | 2.5605E-02 | -1.2077E-02 | 2.7324E-03 |
| A16 = | | -1.3997E-01 | 9.5024E-04 | -2.4636E-04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.33 | ATmax/ATmin | 2.99 |
| Fno | 2.10 | (R5 + R6)/(R5 − R6) | 1.69 |
| HFOV [deg.] | 47.2 | \|f4/f1\| | 0.79 |
| tan(HFOV) | 1.08 | f2/f | −20.10 |
| V4 | 26.6 | f/Y42 | 1.29 |
| Nmax | 1.660 | TL/Y42 | 1.86 |
| T12/T23 | 0.80 | (\|f3\| + \|f4\|)/(\|f1\| + \|f2\|) | 0.10 |
| T12/T34 | 2.39 | (\|P3\| + \|P4\|)/(\|P1\| + \|P2\|) | 3.13 |
| T23/CT2 | 1.50 | | |

In the image capturing lens system according to the 4th embodiment, when an axial distance between the first lens element 410 and the second lens element 420 is T12, an axial distance between the second lens element 420 and the third lens element 430 is T23, and an axial distance between the third lens element 430 and the fourth lens element 440 is T34, the following condition is satisfied: T34<T12<T23.

In the image capturing lens system according to the 4th embodiment, when the axial distance between the second lens element 420 and the third lens element 430 is T23, and a central thickness of the third lens element 430 is CT3, the following condition is satisfied: T23<CT3.

In the image capturing lens system according to the 4th embodiment, when a focal length of the first lens element 410 is f1, a focal length of the second lens element 420 is f2, a focal length of the third lens element 430 is f3, and a focal length of the fourth lens element 440 is f4, the following conditions are satisfied: |f3|<|f1|<|f2|; and |f4|<|f1|<|f2|.

5th Embodiment

Figure 9:
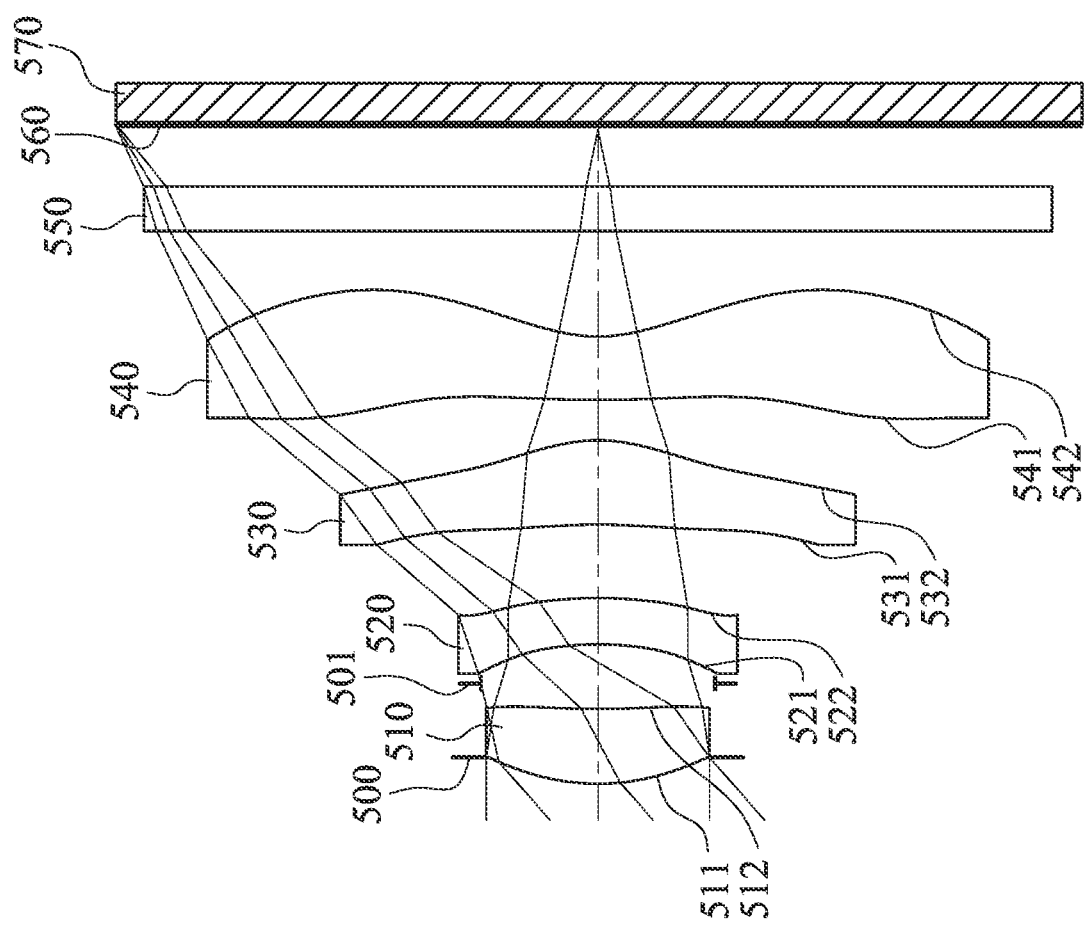
FIG. 9 is a schematic view of an image capturing apparatus according to the 5th embodiment of the present disclosure.
Figure 10:
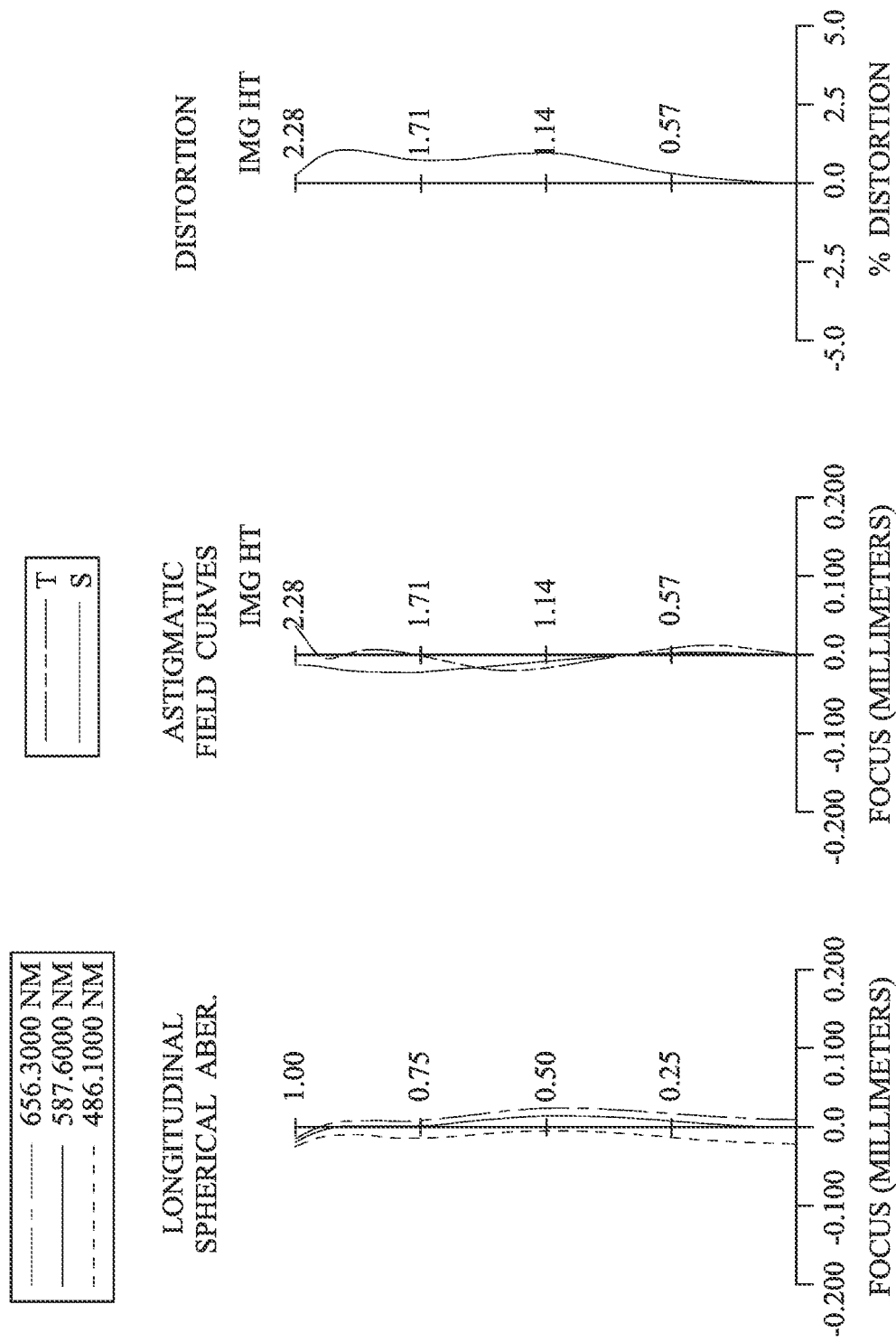
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows spherical aberration curves, astigmatic field curves and a distortion curve of the image capturing apparatus according to the 5th embodiment. In FIG. 9, the image capturing apparatus includes an image capturing lens system (its reference numeral is omitted) and an image sensor 570. The image capturing lens system includes, in order from an object side to an image side, an aperture stop 500, a first lens element 510, a stop 501, a second lens element 520, a third lens element 530, a fourth lens element 540, an IR-cut filter 550 and an image surface 560, wherein the image sensor 570 is disposed on the image surface 560 of the image capturing lens system. The image capturing lens system has a total of four lens elements (510-540).

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with negative refractive power has an object-side surface 521 being concave in a paraxial region thereof and an image-side surface 522 being convex in a paraxial region thereof. The second lens element 520 is made of a plastic material, and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of a plastic material, and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric. Furthermore, the image-side surface 542 of the fourth lens element 540 includes at least one convex shape in an off-axis region thereof.

The IR-cut filter 550 is made of a glass material and located between the fourth lens element 540 and the image surface 560, and will not affect the focal length of the image capturing lens system.

The detailed optical data of the 5th embodiment are shown in Table 9 and the aspheric surface data are shown in Table 10 below.

TABLE 9

5th Embodiment
f = 2.57 mm, Fno = 2.45, HFOV = 41.3 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Ape. Stop | Plano | | −0.125 | | | | |
| 2 | Lens 1 | 1.080 | ASP | 0.355 | Plastic | 1.544 | 56.0 | 2.55 |
| 3 | | 4.301 | ASP | 0.121 | | | | |
| 4 | Stop | Plano | | 0.185 | | | | |
| 5 | Lens 2 | −1.646 | ASP | 0.220 | Plastic | 1.660 | 20.4 | −10.30 |
| 6 | | −2.287 | ASP | 0.348 | | | | |
| 7 | Lens 3 | −2.877 | ASP | 0.400 | Plastic | 1.544 | 56.0 | 1.74 |
| 8 | | −0.747 | ASP | 0.192 | | | | |
| 9 | Lens 4 | 6.804 | ASP | 0.300 | Plastic | 1.544 | 56.0 | −1.50 |
| 10 | | 0.720 | ASP | 0.500 | | | | |

TABLE 9-continued

5th Embodiment
f = 2.57 mm, Fno = 2.45, HFOV = 41.3 deg.

| Surface # | | Curvature Radius | Thickness | Material | Index | Abbe # | Focal Length |
|---|---|---|---|---|---|---|---|
| 11 | IR-cut filter | Plano | 0.210 | Glass | 1.517 | 64.2 | — |
| 12 | | Plano | 0.295 | | | | |
| 13 | Image | Plano | — | | | | |

Note:
Reference wavelength is 587.6 nm (d-line).
The effective radius of the surface 4 is 0.55 mm.

TABLE 10

Aspheric Coefficients

| Surface # | 2 | 3 | 5 | 6 |
|---|---|---|---|---|
| k = | −8.3779E−01 | −9.0000E+01 | 5.0821E+00 | −3.2601E+00 |
| A4 = | 6.4438E−02 | −7.2116E−03 | −4.0461E−01 | −2.3103E−01 |
| A6 = | −3.2503E−01 | −1.0667E+00 | 1.1439E+00 | −3.2333E−01 |
| A8 = | 1.5519E+00 | 1.4672E+00 | −9.4649E+00 | 3.7328E+00 |
| A10 = | −4.8776E+00 | −4.0314E+00 | 4.2990E+01 | −1.3783E+01 |
| A12 = | | | −4.7987E+01 | 3.9818E+01 |
| A14 = | | | | −3.6232E+01 |

| Surface # | 7 | 8 | 9 | 10 |
|---|---|---|---|---|
| k = | 1.9266E+00 | −5.0378E+00 | −4.0503E+01 | −5.8730E+00 |
| A4 = | 4.3412E−01 | 1.1497E−01 | 8.2918E−03 | −1.4808E−01 |
| A6 = | −1.6621E−01 | 1.0032E+00 | −3.6237E−01 | 4.9505E−02 |
| A8 = | −1.0939E+00 | −2.7614E+00 | 4.3661E−01 | −1.2317E−02 |
| A10 = | 1.7202E+00 | 3.1125E+00 | −2.3241E−01 | 1.2915E−03 |
| A12 = | −9.9177E−01 | −1.8077E+00 | 6.5659E−02 | 8.0173E−04 |
| A14 = | 2.0674E−01 | 5.3316E−01 | −9.6490E−03 | −3.3966E−04 |
| A16 = | | −6.3497E−02 | 5.8260E−04 | 3.6891E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

5th Embodiment

| f [mm] | 2.57 | ATmax/ATmin | 1.81 |
|---|---|---|---|
| Fno | 2.45 | (R5 + R6)/(R5 − R6) | 1.70 |
| HFOV [deg.] | 41.3 | |f4/f1| | 0.59 |
| tan(HFOV) | 0.88 | f2/f | −4.01 |
| V4 | 56.0 | f/Y42 | 1.39 |
| Nmax | 1.660 | TL/Y42 | 1.69 |
| T12/T23 | 0.88 | (|f3| + |f4|)/(|f1| + |f2|) | 0.25 |
| T12/T34 | 1.59 | (|P3| + |P4|)/(|P1| + |P2|) | 2.53 |
| T23/CT2 | 1.58 | | |

In the image capturing lens system according to the 5th embodiment, when an axial distance between the first lens element 510 and the second lens element 520 is T12, an axial distance between the second lens element 520 and the third lens element 530 is T23, and an axial distance between the third lens element 530 and the fourth lens element 540 is T34, the following condition is satisfied: T34<T12<T23.

In the image capturing lens system according to the 5th embodiment, when the axial distance between the second lens element 520 and the third is lens element 530 is T23, and a central thickness of the third lens element 530 is CT3, the following condition is satisfied: T23<CT3.

In the image capturing lens system according to the 5th embodiment, when a focal length of the first lens element 510 is f1, a focal length of the second lens element 520 is f2, a focal length of the third lens element 530 is f3, and a focal length of the fourth lens element 540 is f4, the following conditions are satisfied: |f3|<|f1|<|f2|; and |f4|<|f1|<|f2|.

6th Embodiment

Figure 11:
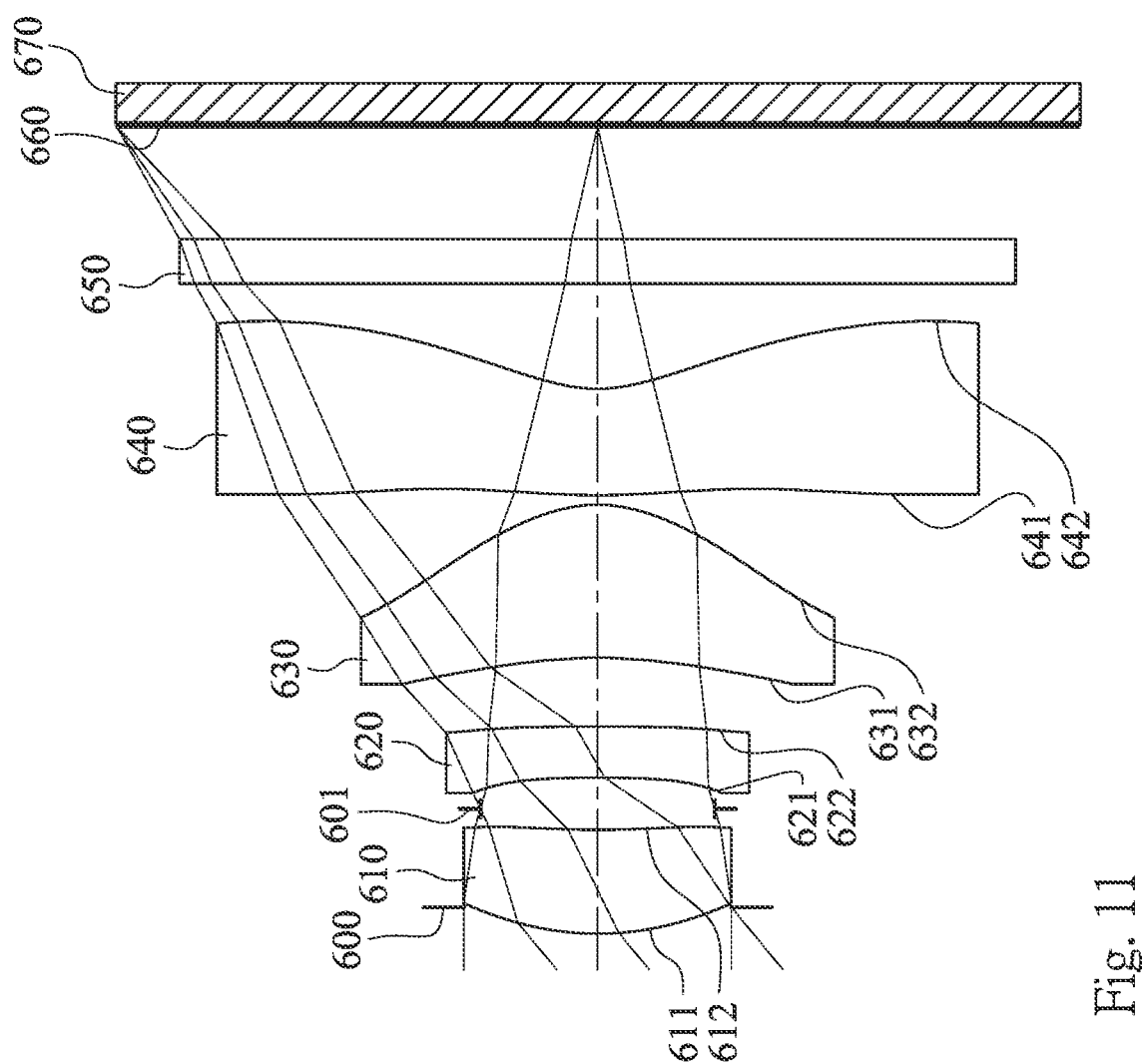
FIG. 11 is a schematic view of an image capturing apparatus according to the 6th embodiment of the present disclosure.
Figure 12:
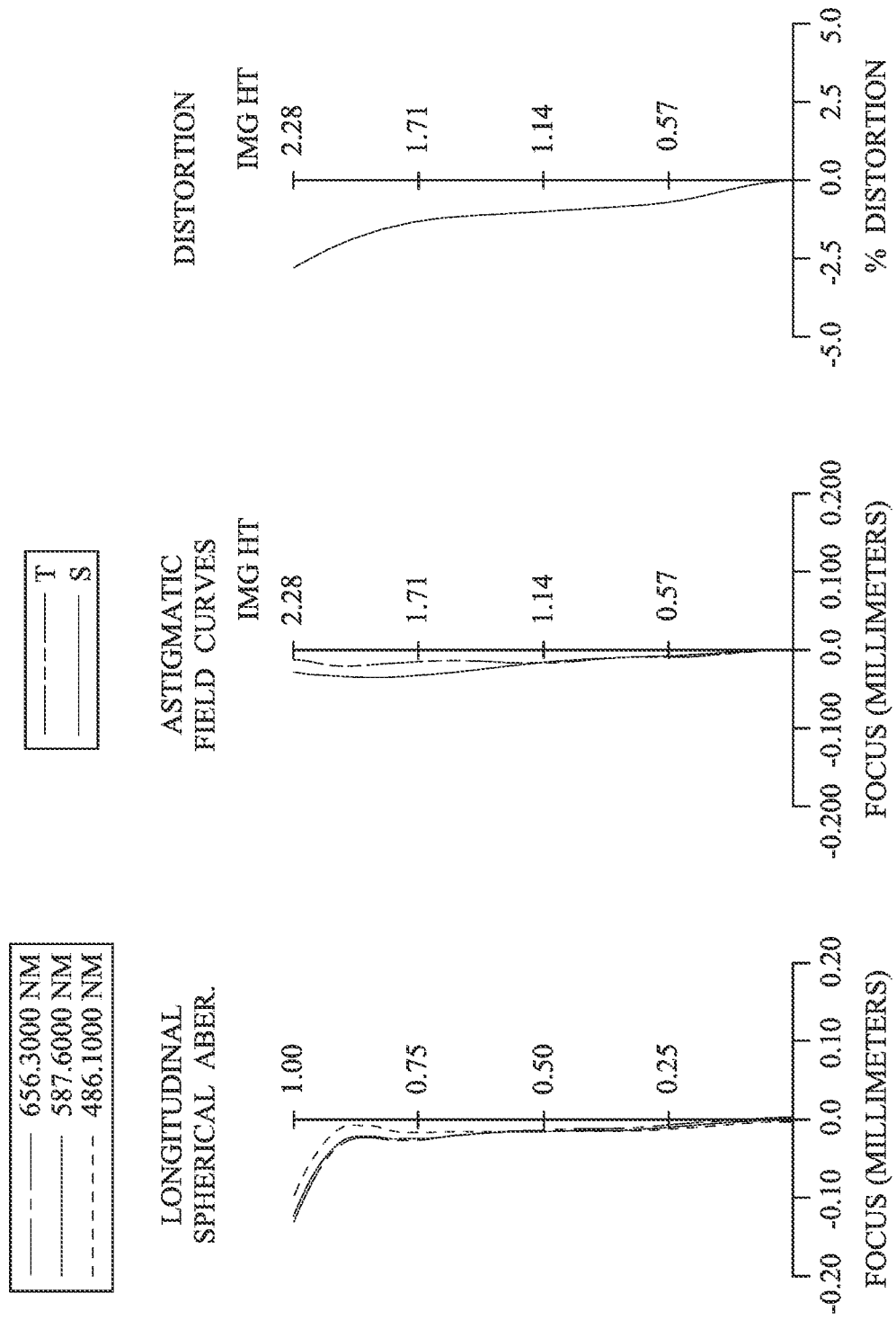
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows spherical aberration curves, astigmatic field curves and a distortion curve of the image capturing apparatus according to the 6th embodiment. In FIG. 11, the image capturing apparatus includes an image capturing lens system (its reference numeral is omitted) and an image sensor 670. The image capturing lens system includes, in order from an object side to an image side, an aperture stop 600, a first lens element 610, a stop 601, a second lens element 620, a third lens element 630, a fourth lens element 640, an IR-cut filter 650 and an image surface 660, wherein the image sensor 670 is disposed on the image surface 660 of the image capturing lens system. The image capturing lens system has a total of four lens elements (610-640).

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with negative refractive power has an object-side surface 621 being concave in a paraxial region thereof and an image-side surface 622 being convex in a paraxial region thereof. The second lens element 620 is made of a plastic material, and has the object-side surface 621 and the image-side surface 622 being both aspheric.

The third lens element 630 with positive refractive power has an object-side surface 631 being concave in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric. Furthermore, the image-side surface 642 of the fourth lens element 640 includes at least one convex shape in an off-axis region thereof.

The IR-cut filter 650 is made of a glass material and located between the fourth lens element 640 and the image surface 660, and will not affect the focal length of the image capturing lens system.

The detailed optical data of the 6th embodiment are shown in Table 11 and the aspheric surface data are shown in Table 12 below.

TABLE 11

6th Embodiment
f = 2.83 mm, Fno = 2.00, HFOV = 39.6 deg.

| Surface # |  | Curvature Radius |  | Thickness | Material | Index | Abbe # | Focal Length |
|---|---|---|---|---|---|---|---|---|
| 0 | Object | Plano |  | 400.000 |  |  |  |  |
| 1 | Ape. Stop | Plano |  | −0.125 |  |  |  |  |
| 2 | Lens 1 | 1.406 | ASP | 0.493 | Plastic | 1.544 | 56.0 | 3.54 |
| 3 |  | 4.558 | ASP | 0.100 |  |  |  |  |
| 4 | Stop | Plano |  | 0.147 |  |  |  |  |
| 5 | Lens 2 | −7.354 | ASP | 0.242 | Plastic | 1.660 | 20.4 | −14.35 |
| 6 |  | −33.333 | ASP | 0.327 |  |  |  |  |
| 7 | Lens 3 | −2.415 | ASP | 0.726 | Plastic | 1.544 | 56.0 | 1.47 |
| 8 |  | −0.665 | ASP | 0.045 |  |  |  |  |
| 9 | Lens 4 | 3.403 | ASP | 0.505 | Plastic | 1.639 | 23.3 | −1.47 |
| 10 |  | 0.692 | ASP | 0.499 |  |  |  |  |
| 11 | IR-cut filter | Plano |  | 0.210 | Glass | 1.517 | 64.2 | — |
| 12 |  | Plano |  | 0.543 |  |  |  |  |
| 13 | Image | Plano |  | — |  |  |  |  |

Note:
Reference wavelength is 587.6 nm (d-line).
The effective radius of the surface 4 is 0.55 mm.

TABLE 12

Aspheric Coefficients

| Surface # | 2 | 3 | 5 | 6 |
|---|---|---|---|---|
| k = | −8.7870E−01 | −9.0000E+01 | −3.0425E+01 | −4.6707E+00 |
| A4 = | 3.3059E−02 | −3.3519E−02 | −2.7204E−01 | −5.4953E−02 |
| A6 = | −6.0769E−02 | −2.7515E−01 | −7.8479E−01 | −3.5621E−01 |
| A8 = | 8.5594E−02 | −5.9830E−01 | 2.1883E+00 | 7.4861E−01 |
| A10 = | −3.1237E−01 | 7.8051E−01 | −6.0406E+00 | −7.8825E−01 |
| A12 = |  |  | 8.5870E+00 | 1.0819E+00 |
| A14 = |  |  |  | −1.8261E−01 |

| Surface # | 7 | 8 | 9 | 10 |
|---|---|---|---|---|
| k = | 3.2236E+00 | −3.6900E+00 | −1.1068E+01 | −5.9238E+00 |
| A4 = | 1.9024E−01 | −3.2190E−01 | −2.3566E−01 | −1.3662E−01 |
| A6 = | −2.3398E−01 | 6.1058E−01 | 2.4685E−01 | 1.0911E−01 |
| A8 = | 4.3785E−01 | −8.7603E−01 | −1.8507E−01 | −6.4880E−02 |
| A10 = | −4.8167E−01 | 9.5046E−01 | 1.0305E−01 | 2.6052E−02 |
| A12 = | 3.0212E−01 | −5.6308E−01 | −3.7717E−02 | −6.6590E−03 |
| A14 = | −9.3592E−02 | 1.5355E−01 | 7.9131E−03 | 9.7620E−04 |
| A16 = |  | −1.5547E−02 | −7.2104E−04 | −6.2346E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.83 | ATmax/ATmin | 7.27 |
| Fno | 2.00 | (R5 + R6)/(R5 − R6) | 1.76 |
| HFOV [deg.] | 39.6 | |f4/f1| | 0.41 |
| tan(HFOV) | 0.83 | f2/f | −5.07 |
| V4 | 23.3 | f/Y42 | 1.57 |
| Nmax | 1.660 | TL/Y42 | 2.13 |
| T12/T23 | 0.76 | (|f3| + |f4|)/(|f1| + |f2|) | 0.16 |
| T12/T34 | 5.49 | (|P3| + |P4|)/(|P1| + |P2|) | 3.87 |
| T23/CT2 | 1.35 | | |

In the image capturing lens system according to the 6th embodiment, when an axial distance between the first lens element 610 and the second lens element 620 is T12, an axial distance between the second lens element 620 and the third lens element 630 is T23, and an axial distance between the third lens element 630 and the fourth lens element 640 is T34, the following condition is satisfied: T34<T12<T23.

In the image capturing lens system according to the 6th embodiment, when the axial distance between the second lens element 620 and the third lens element 630 is T23, and a central thickness of the third lens element 630 is CT3, the following condition is satisfied: T23<CT3.

In the image capturing lens system according to the 6th embodiment, when a focal length of the first lens element 610 is f1, a focal length of the second lens element 620 is f2, a focal length of the third lens element 630 is f3, and a focal length of the fourth lens element 640 is f4, the following conditions are satisfied: |f3|<|f1|<|f2|; and |f4|<|f1|<|f2|.

7th Embodiment

Figure 13:
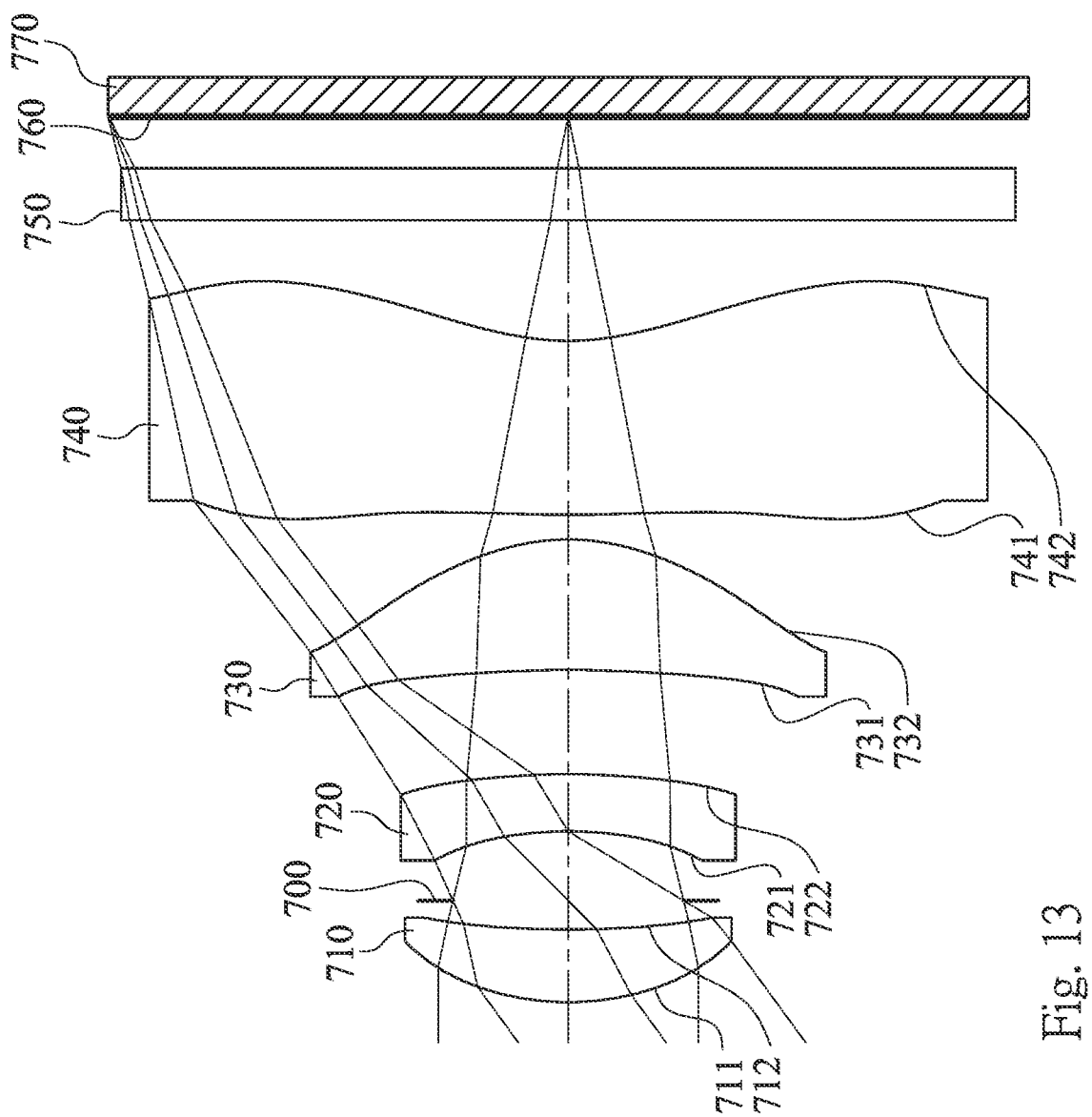
FIG. 13 is a schematic view of an image capturing apparatus according to the 7th embodiment of the present disclosure.
Figure 14:
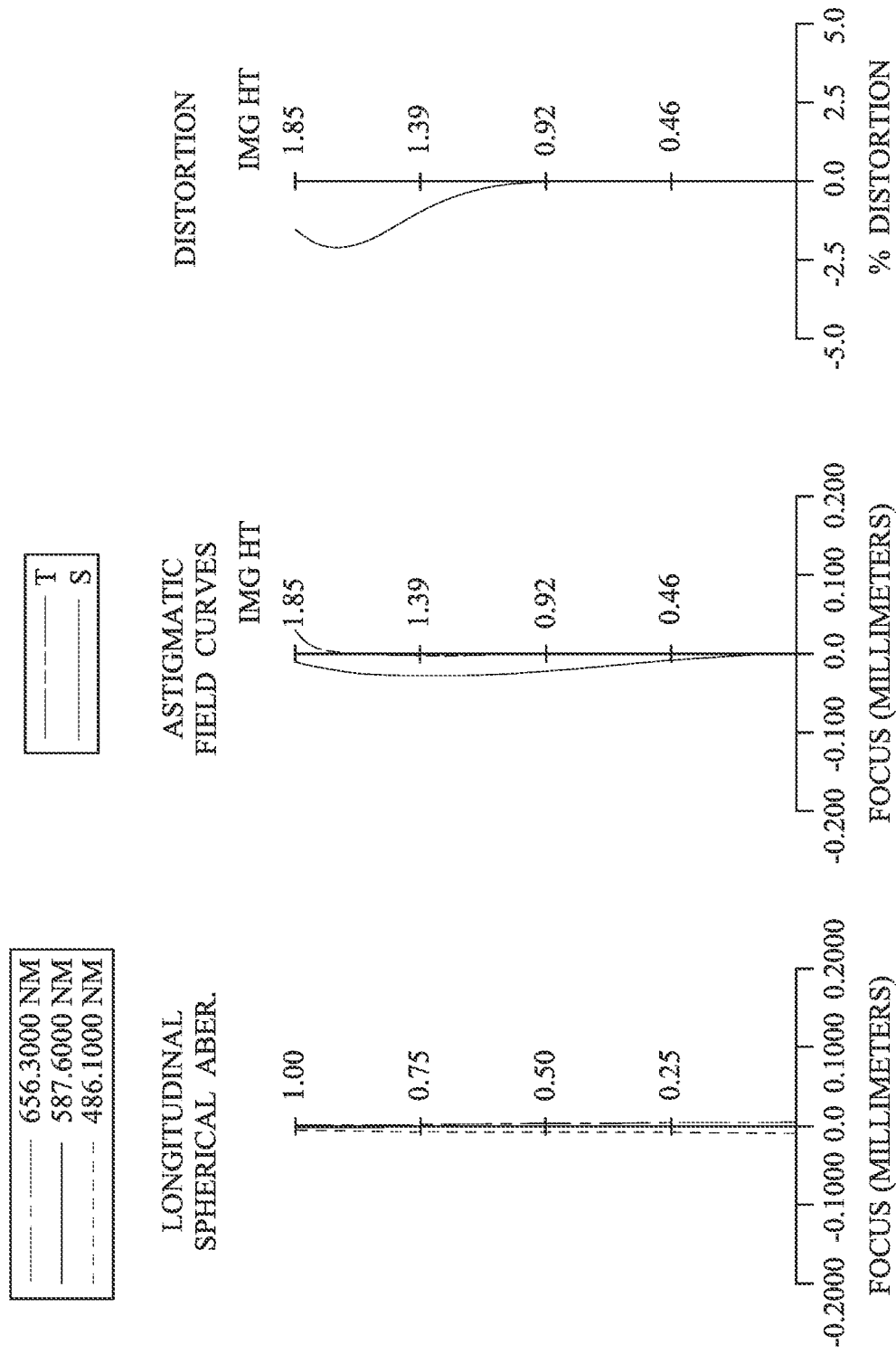
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows spherical aberration curves, astigmatic field curves and a distortion curve of the image capturing apparatus according to the 7th embodiment. In FIG. 13, the image capturing apparatus includes an image capturing lens system (its reference numeral is omitted) and an image sensor 770. The image capturing lens system includes, in order from an object side to an image side, a first lens element 710, an aperture stop 700, a second lens element 720, a third lens element 730, a fourth lens element 740, an IR-cut filter 750 and an image surface 760, wherein the image sensor 770 is disposed on the image surface 760 of the image capturing lens system. The image capturing lens system has a total of four lens elements (710-740).

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with negative refractive power has an object-side surface 721 being concave in a paraxial region thereof and an image-side surface 722 being convex in a paraxial region thereof. The second lens element 720 is made of a plastic material, and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric. Furthermore, the image-side surface 742 of the fourth lens element 740 includes at least one convex shape in an off-axis region thereof.

The IR-cut filter 750 is made of a glass material and located between the fourth lens element 740 and the image surface 760, and will not affect the focal length of the image capturing lens system.

The detailed optical data of the 7th embodiment are shown in Table 13 and the aspheric surface data are shown in Table 14 below.

TABLE 13

7th Embodiment
f = 2.57 mm, Fno = 2.45, HFOV = 36.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.147 | ASP | 0.293 | Plastic | 1.544 | 56.0 | 2.70 |
| 2 | | 4.726 | ASP | 0.116 | | | | |
| 3 | Ape. Stop | Plano | | 0.280 | | | | |
| 4 | Lens 2 | −1.503 | ASP | 0.230 | Plastic | 1.660 | 20.4 | −4.92 |
| 5 | | −2.968 | ASP | 0.420 | | | | |
| 6 | Lens 3 | −4.746 | ASP | 0.526 | Plastic | 1.544 | 56.0 | 1.90 |
| 7 | | −0.884 | ASP | 0.100 | | | | |
| 8 | Lens 4 | 6.938 | ASP | 0.700 | Plastic | 1.544 | 56.0 | −2.34 |
| 9 | | 1.038 | ASP | 0.486 | | | | |
| 10 | IR-cut filter | Plano | | 0.210 | Glass | 1.517 | 64.2 | — |
| 11 | | Plano | | 0.208 | | | | |
| 12 | Image | Plano | | — | | | | |

Note:
Reference wavelength is 587.6 nm (d-line).

TABLE 14

Aspheric Coefficients

| Surface # | 1 | 2 | 4 | 5 |
|---|---|---|---|---|
| k = | −8.1932E−02 | −3.4653E+01 | −2.9690E+00 | −3.3321E+01 |
| A4 = | 9.1854E−02 | 1.4350E−01 | −1.0772E−01 | −6.4649E−03 |
| A6 = | 2.2474E−01 | −1.4289E−01 | −7.8748E−01 | −2.1462E−01 |
| A8 = | −3.8994E−01 | 1.1984E+00 | 2.0093E+00 | 6.3360E−02 |
| A10 = | 1.9157E+00 | −3.4524E+00 | −9.0572E+00 | −4.9418E−01 |
| A12 = | −1.5101E+00 | 2.8676E+00 | 8.3066E+00 | −4.1936E−01 |
| A14 = | | | | 1.8202E+00 |

| Surface # | 6 | 7 | 8 | 9 |
|---|---|---|---|---|
| k = | −1.0735E+01 | −1.9278E+00 | −7.2351E+01 | −5.3958E+00 |
| A4 = | 1.1343E−01 | 8.1966E−02 | −8.3585E−02 | −1.1417E−01 |
| A6 = | −2.5192E−01 | −3.3251E−01 | −1.2619E−01 | 6.9541E−02 |
| A8 = | 1.7595E−01 | 4.5144E−01 | 2.6188E−01 | −4.7923E−02 |
| A10 = | −8.3226E−02 | −3.2474E−01 | −1.6959E−01 | 2.3733E−02 |
| A12 = | 7.2736E−02 | 1.7358E−01 | 5.4850E−02 | −8.4327E−03 |
| A14 = | −1.0127E−01 | −3.8369E−03 | −9.0373E−03 | 1.8826E−03 |
| A16 = | | −2.7564E−02 | 6.0588E−04 | −1.7742E−04 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.57 | ATmax/ATmin | 4.20 |
| Fno | 2.45 | (R5 + R6)/(R5 − R6) | 1.46 |
| HFOV [deg.] | 36.2 | |f4/f1| | 0.87 |
| tan(HFOV) | 0.73 | f2/f | −1.92 |
| V4 | 56.0 | f/Y42 | 1.52 |
| Nmax | 1.660 | TL/Y42 | 2.11 |
| T12/T23 | 0.94 | (|f3| + |f4|)/(|f1| + |f2|) | 0.56 |
| T12/T34 | 3.96 | (|P3| + |P4|)/(|P1| + |P2|) | 1.66 |
| T23/CT2 | 1.83 | | |

In the image capturing lens system according to the 7th embodiment, when an axial distance between the first lens element 710 and the second lens element 720 is T12, an axial distance between the second lens element 720 and the third lens element 730 is T23, and an axial distance between the third lens element 730 and the fourth lens element 740 is T34, the following condition is satisfied: T34<T12<T23.

In the image capturing lens system according to the 7th embodiment, when the axial distance between the second lens element 720 and the third lens element 730 is T23, and a central thickness of the third lens element 730 is CT3, the following condition is satisfied: T23<CT3.

In the image capturing lens system according to the 7th embodiment, when a focal length of the first lens element 710 is f1, a focal length of the second lens element 720 is f2, a focal length of the third lens element 730 is f3, and a focal length of the fourth lens element 740 is f4, the following conditions are satisfied: |f3|<|f1|<|f2|; and |f4|<|f1|<|f2|.

8th Embodiment

Figure 15:
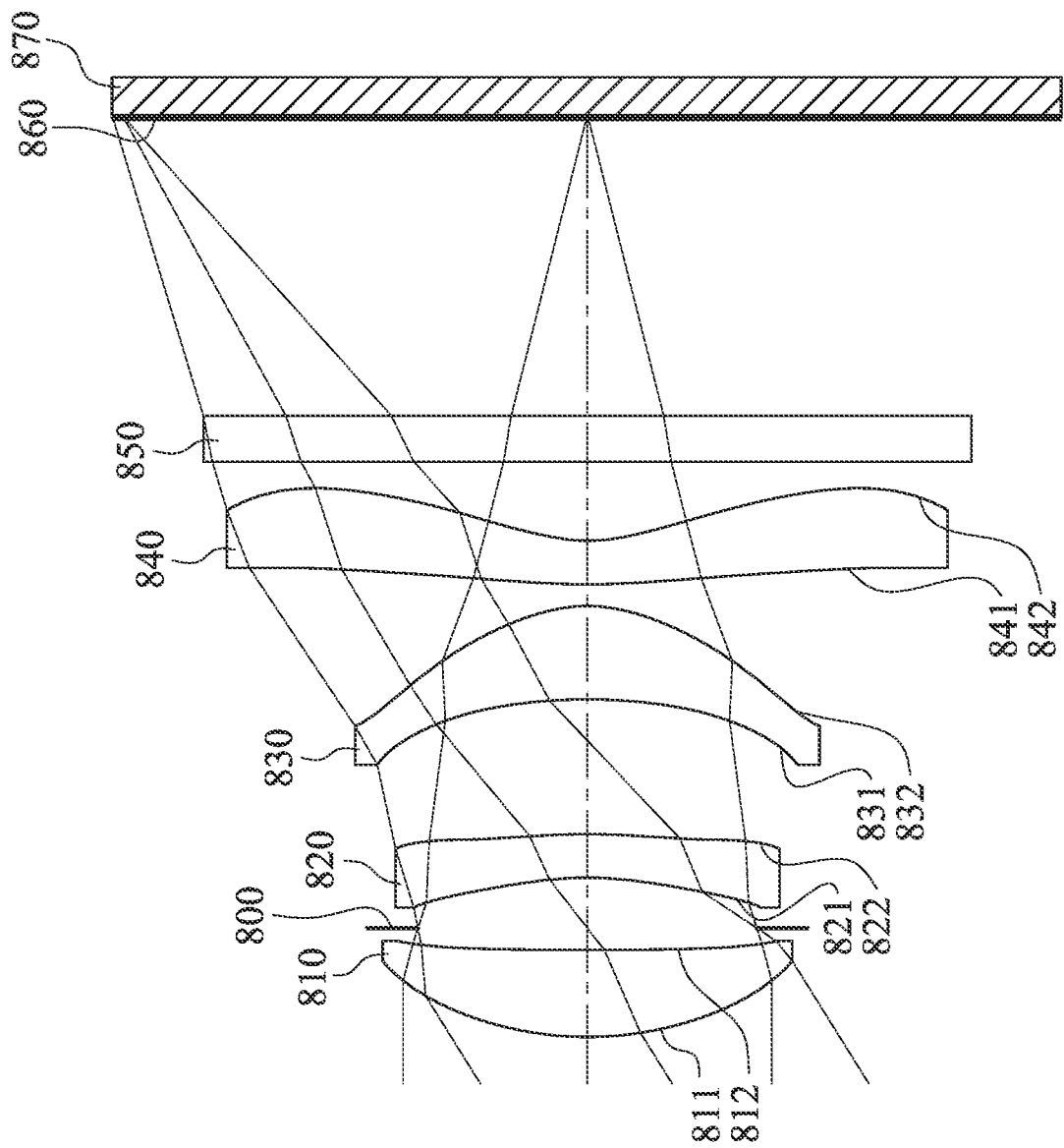
FIG. 15 is a schematic view of an image capturing apparatus according to the 8th embodiment of the present disclosure.
Figure 16:
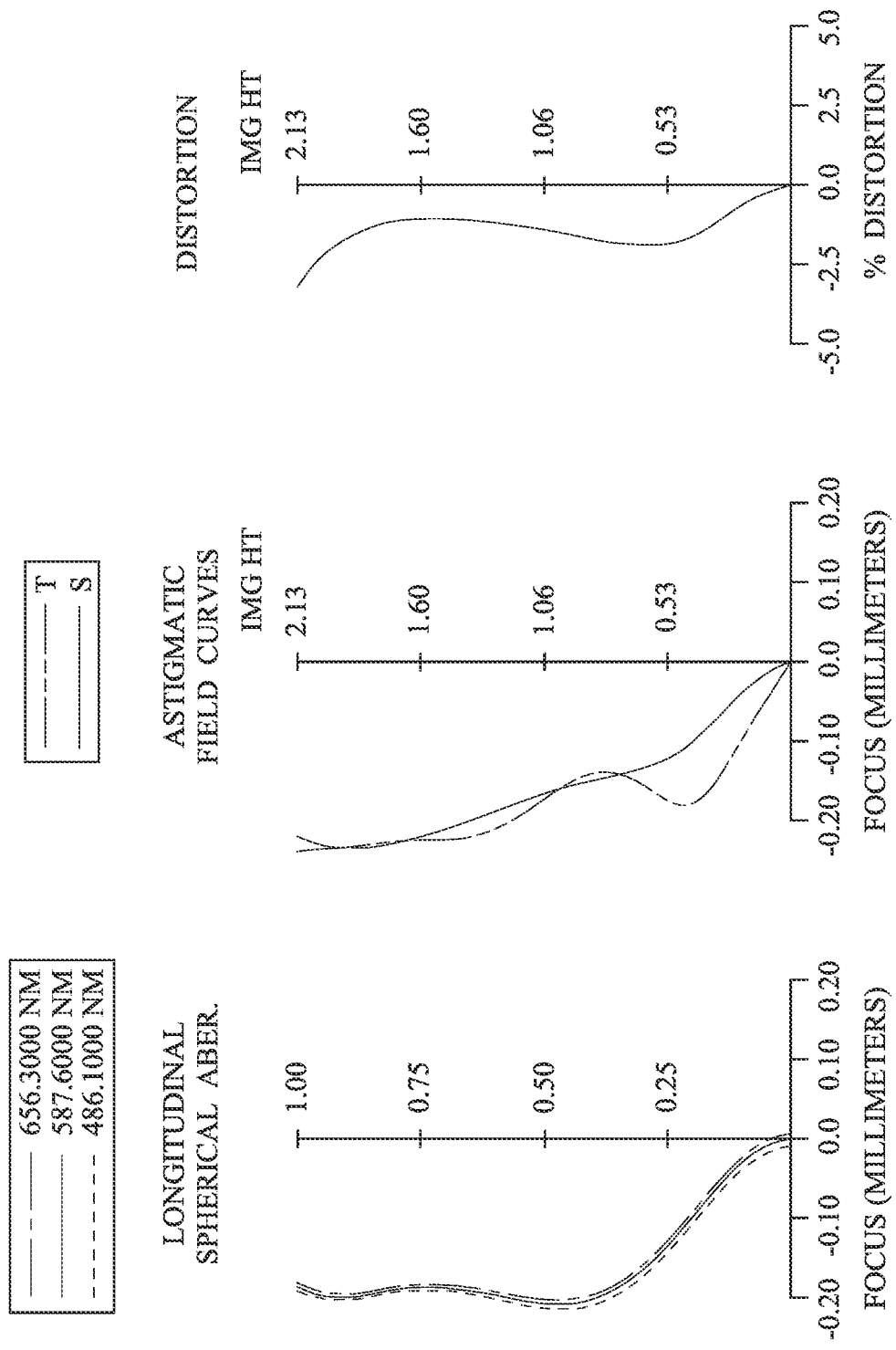
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows spherical aberration curves, astigmatic field curves and a distortion curve of the image capturing apparatus according to the 8th embodiment. In FIG. 15, the image capturing apparatus includes an image capturing lens system (its reference numeral is omitted) and an image sensor 870. The image capturing lens system includes, in order from an object side to an image side, a first lens element 810, an aperture stop 800, a second lens element 820, a third lens element 830, a fourth lens element 840, an IR-cut filter 850 and an image surface 860, wherein the image sensor 870 is disposed on the image surface 860 of the image capturing lens system. The image capturing lens system has a total of four lens elements (810-840).

The first lens element 810 with positive refractive power has an object-side surface 811 being convex in a paraxial region thereof and an image-side surface 812 being concave in a paraxial region thereof. The first lens element 810 is made of a plastic material, and has the object-side surface 811 and the image-side surface 812 being both aspheric.

The second lens element 820 with negative refractive power has an object-side surface 821 being concave in a paraxial region thereof and an image-side surface 822 being convex in a paraxial region thereof. The second lens element 820 is made of a plastic material, and has the object-side surface 821 and the image-side surface 822 being both aspheric.

The third lens element 830 with positive refractive power has an object-side surface 831 being concave in a paraxial region thereof and an image-side surface 832 being convex in a paraxial region thereof. The third lens element 830 is made of a plastic material, and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric. Furthermore, the image-side surface 842 of the fourth lens element 840 includes at least one convex shape in an off-axis region thereof.

The IR-cut filter 850 is made of a glass material and located between the fourth lens element 840 and the image surface 860, and will not affect the focal length of the image capturing lens system.

The detailed optical data of the 8th embodiment are shown in Table 15 and the aspheric surface data are shown in Table 16 below.

TABLE 15

8th Embodiment
f = 3.70 mm, Fno = 2.20, HFOV = 31.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.613 | ASP | 0.400 | Plastic | 1.544 | 56.0 | 3.10 |
| 2 | | 33.333 | ASP | 0.100 | | | | |
| 3 | Ape. Stop | Plano | | 0.232 | | | | |
| 4 | Lens 2 | −1.584 | ASP | 0.200 | Plastic | 1.660 | 20.4 | −5.32 |
| 5 | | −3.030 | ASP | 0.620 | | | | |
| 6 | Lens 3 | −2.530 | ASP | 0.429 | Plastic | 1.544 | 56.0 | 1.59 |
| 7 | | −0.685 | ASP | 0.100 | | | | |
| 8 | Lens 4 | 3.472 | ASP | 0.200 | Plastic | 1.535 | 55.8 | −1.83 |
| 9 | | 0.749 | ASP | 0.364 | | | | |
| 10 | IR-cut filter | Plano | | 0.210 | Glass | 1.517 | 64.2 | — |
| 11 | | Plano | | 1.370 | | | | |
| 12 | Image | Plano | | — | | | | |

Note:
Reference wavelength is 587.6 nm (d-line).

TABLE 16

Aspheric Coefficients

| Surface # | 1 | 2 | 4 | 5 |
|---|---|---|---|---|
| k = | −9.7797E−01 | −9.0000E+01 | −1.8364E+01 | −3.1616E+01 |
| A4 = | 5.0308E−02 | 1.1230E−02 | −5.7738E−02 | 2.2696E−01 |
| A6 = | −6.2168E−02 | 7.8150E−02 | 4.4405E−01 | 4.8572E−02 |
| A8 = | 2.1198E−01 | −1.2253E−01 | −1.1910E+00 | −1.2660E+00 |
| A10 = | −2.5141E−01 | 1.9906E−01 | 1.4416E+00 | 2.7762E+00 |
| A12 = | 1.7669E−01 | −1.0922E−01 | −9.3850E−01 | −3.0861E+00 |
| A14 = | | | | 1.2646E+00 |

| Surface # | 6 | 7 | 8 | 9 |
|---|---|---|---|---|
| k = | 5.3276E+00 | −3.6457E+00 | −8.9196E+01 | −8.3136E+00 |
| A4 = | 1.4308E−02 | −6.5959E−02 | 1.0419E−02 | −1.0041E−01 |
| A6 = | −7.4481E−02 | −3.1671E−01 | −1.2023E−01 | 7.0892E−02 |
| A8 = | −1.2282E−01 | 4.5079E−01 | 1.9883E−01 | −5.0549E−02 |
| A10 = | 3.5313E−01 | −2.8132E−01 | −1.5095E−01 | 2.8419E−02 |
| A12 = | −1.0565E−01 | 1.3816E−01 | 5.9121E−02 | −1.1502E−02 |
| A14 = | −8.5879E−02 | −4.1826E−02 | −1.1651E−02 | 2.5358E−03 |
| A16 = | | 1.0737E−02 | 9.2183E−04 | −2.1846E−04 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th embodiment | | | |
|---|---|---|---|
| f [mm] | 3.70 | ATmax/ATmin | 6.20 |
| Fno | 2.20 | (R5 + R6)/(R5 − R6) | 1.74 |
| HFOV [deg.] | 31.9 | |f4/f1| | 0.59 |
| tan(HFOV) | 0.62 | f2/f | −1.44 |
| V4 | 55.8 | f/Y42 | 2.25 |
| Nmax | 1.660 | TL/Y42 | 2.57 |
| T12/T23 | 0.54 | (|f3| + |f4|)/(|f1| + |f2|) | 0.41 |
| T12/T34 | 3.32 | (|P3| + |P4|)/(|P1| + |P2|) | 2.30 |
| T23/CT2 | 3.10 | | | in the image capturing lens system according to the 8th embodiment, when an axial distance between the first lens element 810 and the second lens element 820 is T12, an axial distance between the second lens element 820 and the third lens element 830 is T23, and an axial distance between the third lens element 830 and the fourth lens element 840 is T34, the following condition is satisfied: T34<T12<T23.

In the image capturing lens system according to the 8th embodiment, when a focal length of the first lens element 810 is f1, a focal length of the second lens element 820 is f2, a focal length of the third lens element 830 is f3, and a focal length of the fourth lens element 840 is f4, the following conditions are satisfied: |f3|<|f1|<|f2|; and |f4|<|f1|<|f2|.

9th Embodiment

Figure 17:
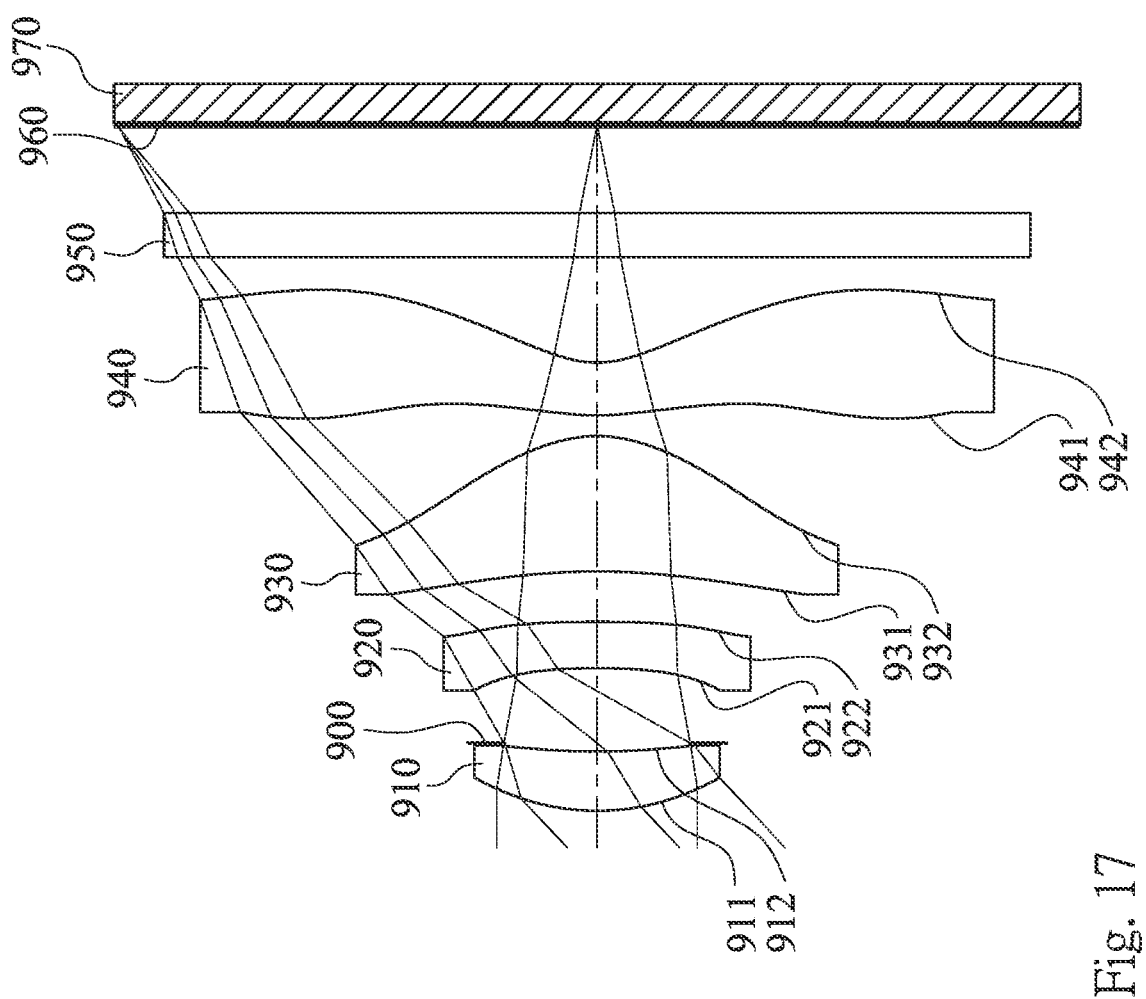
FIG. 17 is a schematic view of an image capturing apparatus according to the 9th embodiment of the present disclosure.
Figure 18:
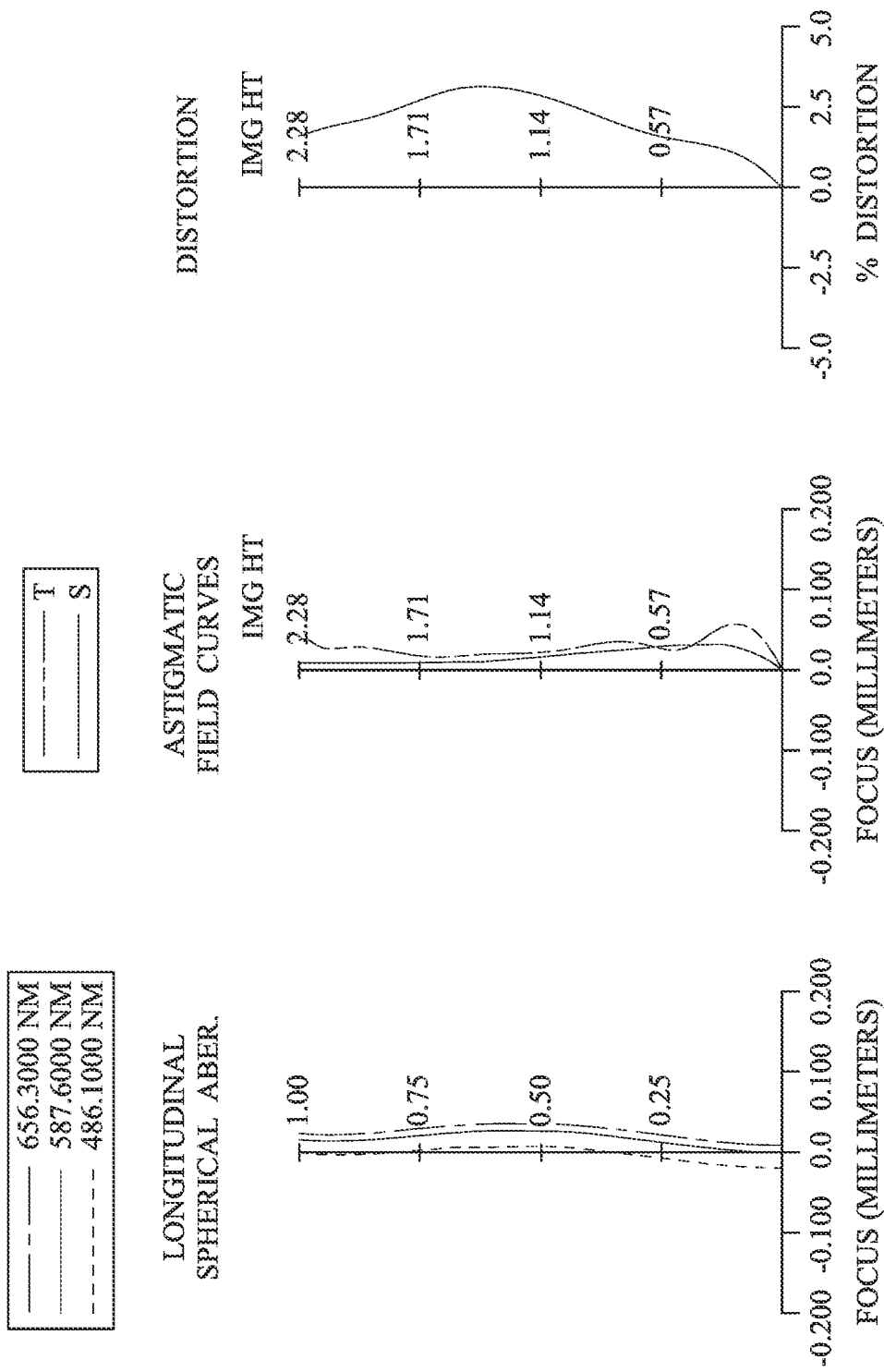
FIG. 18 shows spherical aberration curves, astigmatic field curves and a distortion curve of the image capturing apparatus according to the 9th embodiment.

FIG. 17 is a schematic view of an image capturing apparatus according to the 9th embodiment of the present disclosure. FIG. 18 shows spherical aberration curves, astigmatic field curves and a distortion curve of the image capturing apparatus according to the 9th embodiment. In FIG. 17, the image capturing apparatus includes an image capturing lens system (its reference numeral is omitted) and an image sensor 970. The image capturing lens system includes, in order from an object side to an image side, a first lens element 910, an aperture stop 900, a second lens element 920, a third lens element 930, a fourth lens element 940, an IR-cut filter 950 and an image surface 960, wherein the image sensor 970 is disposed on the image surface 960 of the image capturing lens system. The image capturing lens system has a total of four lens elements (910-940).

The first lens element 910 with positive refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric.

The second lens element 920 with negative refractive power has an object-side surface 921 being concave in a paraxial region thereof and an image-side surface 922 being convex in a paraxial region thereof. The second lens element 920 is made of a plastic material, and has the object-side surface 921 and the image-side surface 922 being both aspheric.

The third lens element 930 with positive refractive power has an object-side surface 931 being concave in a paraxial region thereof and an image-side surface 932 being convex in a paraxial region thereof. The third lens element 930 is made of a plastic material, and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of a plastic material, and has the object-side surface 941 and the image-side surface 942 being both aspheric. Furthermore, the image-side surface 942 of the fourth lens element 940 includes at least one convex shape in an off-axis region thereof.

The IR-cut filter 950 is made of a glass material and located between the fourth lens element 940 and the image surface 960, and will not affect the focal length of the image capturing lens system.

The detailed optical data of the 9th embodiment are shown in Table 17 and the aspheric surface data are shown in Table 18 below.

TABLE 17

9th Embodiment
f = 2.38 mm, Fno = 2.50, HFOV = 43.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.136 | ASP | 0.281 | Plastic | 1.535 | 55.8 | 3.09 |
| 2 | | 3.307 | ASP | 0.040 | | | | |
| 3 | Ape. Stop | Plano | | 0.356 | | | | |
| 4 | Lens 2 | −3.265 | ASP | 0.220 | Plastic | 1.650 | 21.4 | −9.25 |
| 5 | | −7.337 | ASP | 0.238 | | | | |
| 6 | Lens 3 | −3.513 | ASP | 0.643 | Plastic | 1.535 | 55.8 | 1.36 |
| 7 | | −0.643 | ASP | 0.098 | | | | |
| 8 | Lens 4 | 1.215 | ASP | 0.250 | Plastic | 1.535 | 55.8 | −1.56 |
| 9 | | 0.459 | ASP | 0.500 | | | | |
| 10 | IR-cut filter | Plano | | 0.210 | Glass | 1.517 | 64.2 | — |
| 11 | | Plano | | 0.430 | | | | |
| 12 | Image | Plano | | — | | | | |

Note:
Reference wavelength is 587.6 nm (d-line).

TABLE 18

Aspheric Coefficients

| Surface # | 1 | 2 | 4 | 5 |
|---|---|---|---|---|
| k = | −4.4683E−01 | −9.0000E+01 | 1.2089E+01 | 8.8323E+01 |
| A4 = | 5.9346E−02 | 2.5671E−01 | −4.0918E−01 | −2.9947E−01 |
| A6 = | −9.0959E−02 | −9.4806E−01 | 5.5301E−01 | 8.5879E−01 |
| A8 = | 6.1201E−01 | 1.3542E+00 | −4.5184E+00 | −2.8477E+00 |
| A10 = | −1.8662E+00 | −2.0836E+00 | 1.2679E+01 | 5.5854E+00 |
| A12 = | | | −1.2003E+01 | −4.6400E+00 |
| A14 = | | | | 2.7746E+00 |

| Surface # | 6 | 7 | 8 | 9 |
|---|---|---|---|---|
| k = | 2.3938E+00 | −1.4805E+00 | −4.0503E+01 | −4.5293E+00 |
| A4 = | −3.9977E−02 | 5.0860E−01 | −1.0498E−01 | −1.7033E−01 |
| A6 = | 2.8493E−01 | −1.1031E+00 | −1.0917E−01 | 1.0577E−01 |
| A8 = | −3.7425E−01 | 1.2405E+00 | 1.8736E−01 | −4.9875E−02 |
| A10 = | 1.7430E−01 | −3.4012E−01 | −1.0151E−01 | 1.4756E−02 |
| A12 = | 2.7187E−02 | −3.3878E−01 | 2.7627E−02 | −2.3491E−03 |
| A14 = | −2.8000E−02 | 2.4647E−01 | −3.8438E−03 | 1.7736E−04 |
| A16 = | | −4.4674E−02 | 2.1754E−04 | −5.0149E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th embodiment | | | |
|---|---|---|---|
| f [mm] | 2.38 | ATmax/ATmin | 4.04 |
| Fno | 2.50 | (R5 + R6)/(R5 − R6) | 1.45 |
| HFOV [deg.] | 43.2 | \|f4/f1\| | 0.50 |
| tan(HFOV) | 0.94 | f2/f | −3.89 |
| V4 | 55.8 | f/Y42 | 1.26 |
| Nmax | 1.650 | TL/Y42 | 1.74 |
| T12/T23 | 1.66 | (\|f3\| + \|f4\|)/(\|f1\| + \|f2\|) | 0.24 |
| T12/T34 | 4.04 | (\|P3\| + \|P4\|)/(\|P1\| + \|P2\|) | 3.19 |
| T23/CT2 | 1.08 | | |

In the image capturing lens system according to the 9th embodiment, when the axial distance between the second lens element 920 and the third lens element 930 is T23, and a central thickness of the third lens element 930 is CT3, the following condition is satisfied: T23<CT3.

In the image capturing lens system according to the 9th embodiment, when a focal length of the first lens element 910 is f1, a focal length of the second lens element 920 is f2, a focal length of the third lens element 930 is f3, and a focal length of the fourth lens element 940 is f4, the following conditions are satisfied: |f3|<|f1|<|f2|; and |f4|<|f1|<|f2|.

10th Embodiment

Figure 19:
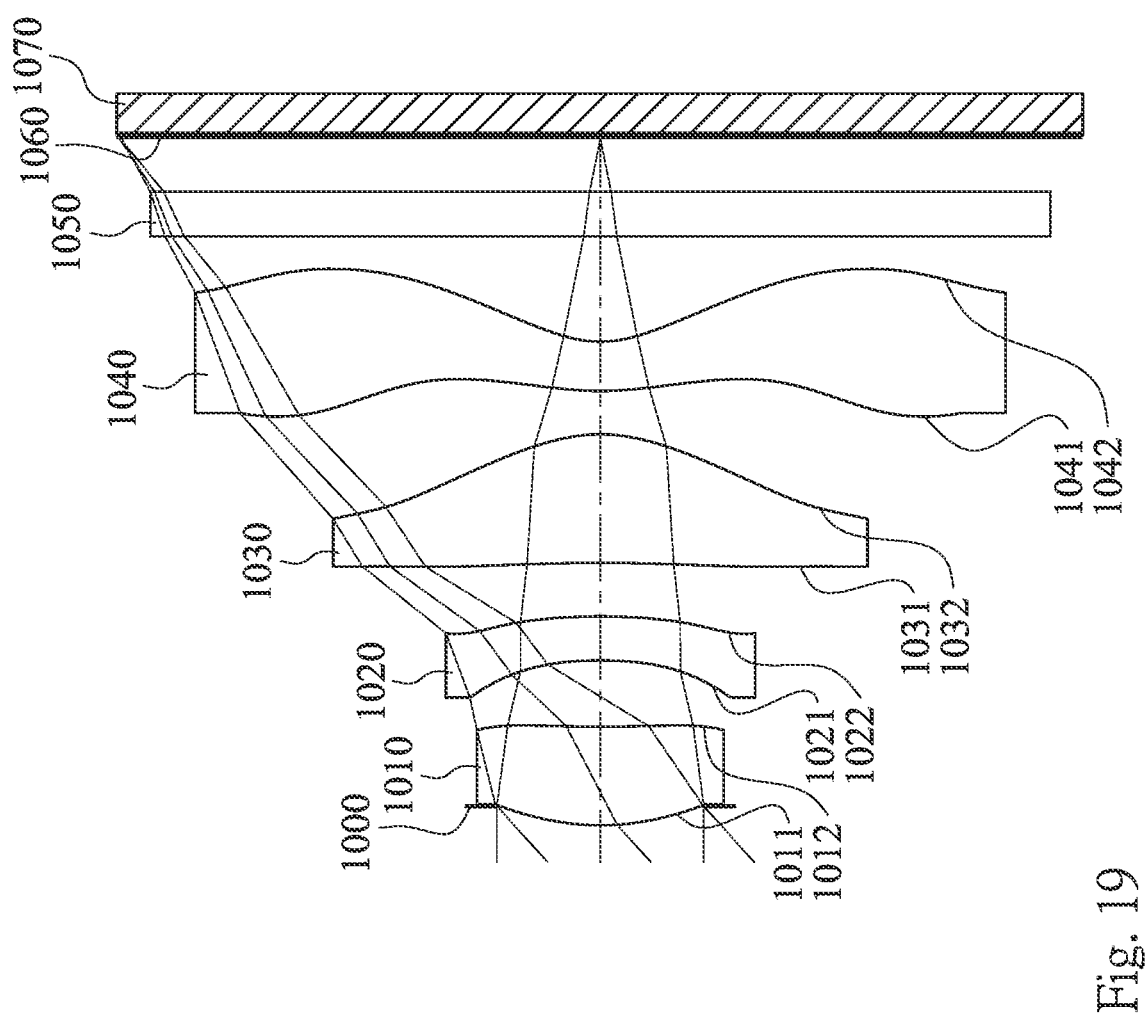
FIG. 19 is a schematic view of an image capturing apparatus according to the 10th embodiment of the present disclosure.
Figure 20:
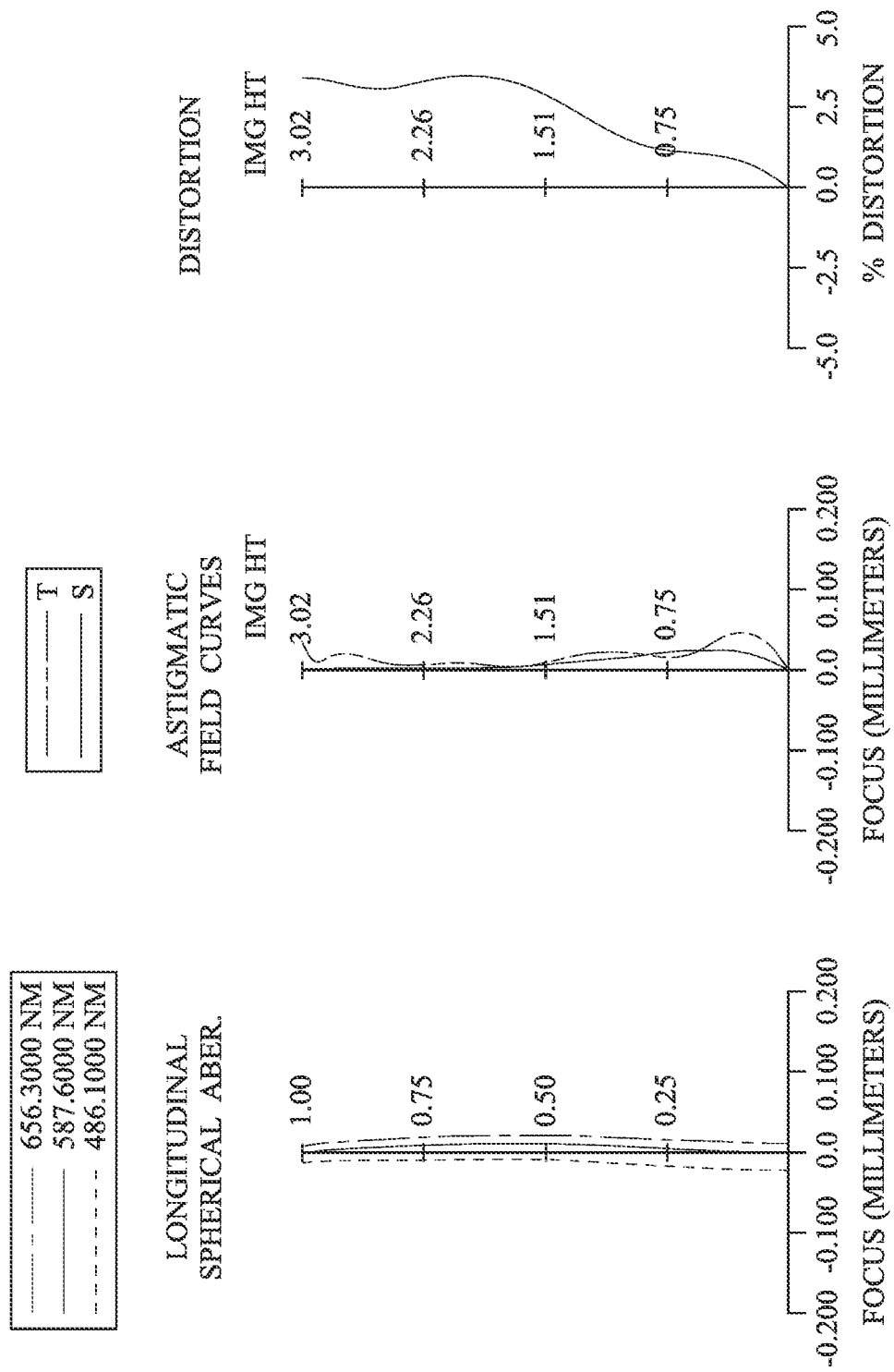
FIG. 20 shows spherical aberration curves, astigmatic field curves and a distortion curve of the image capturing apparatus according to the 10th embodiment.

FIG. 19 is a schematic view of an image capturing apparatus according to the 10th embodiment of the present disclosure. FIG. 20 shows spherical aberration curves, astigmatic field curves and a distortion curve of the image capturing apparatus according to the 10th embodiment. In FIG. 19, the image capturing apparatus includes an image capturing lens system (its reference numeral is omitted) and an image sensor 1070. The image capturing lens system includes, in order from an object side to an image side, an aperture stop 1000, a first lens element 1010, a second lens element 1020, a third lens element 1030, a fourth lens element 1040, an IR-cut filter 1050 and an image surface 1060, wherein the image sensor 1070 is disposed on the image surface 1060 of the image capturing lens system. The image capturing lens system has a total of four lens elements (1010-1040).

The first lens element 1010 with positive refractive power has an object-side surface 1011 being convex in a paraxial region thereof and an image-side surface 1012 being concave in a paraxial region thereof. The first lens element 1010 is made of a plastic material, and has the object-side surface 1011 and the image-side surface 1012 being both aspheric.

The second lens element 1020 with negative refractive power has an object-side surface 1021 being concave in a paraxial region thereof and an image-side surface 1022 being convex in a paraxial region thereof. The second lens element 1020 is made of a plastic material, and has the object-side surface 1021 and the image-side surface 1022 being both aspheric.

The third lens element 1030 with positive refractive power has an object-side surface 1031 being concave in a paraxial region thereof and an image-side surface 1032 being convex in a paraxial region thereof. The third lens element 1030 is made of a plastic material, and has the object-side surface 1031 and the image-side surface 1032 being both aspheric.

The fourth lens element 1040 with negative refractive power has an object-side surface 1041 being convex in a paraxial region thereof and an image-side surface 1042 being concave in a paraxial region thereof. The fourth lens element 1040 is made of a plastic material, and has the object-side surface 1041 and the image-side surface 1042 being both aspheric. Furthermore, the image-side surface 1042 of the fourth lens element 1040 includes at least one convex shape in an off-axis region thereof.

The IR-cut filter 1050 is made of a glass material and located between the fourth lens element 1040 and the image surface 1060, and will not affect the focal length of the image capturing lens system.

The detailed optical data of the 10th embodiment are shown in Table 19 and the aspheric surface data are shown in Table 20 below.

TABLE 19

10th Embodiment
f = 3.23 mm, Fno = 2.50, HFOV = 42.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.120 | | | | |
| 2 | Lens 1 | 1.648 | ASP | 0.617 | Plastic | 1.544 | 56.0 | 3.64 |
| 3 | | 8.534 | ASP | 0.415 | | | | |
| 4 | Lens 2 | −2.361 | ASP | 0.276 | Plastic | 1.650 | 21.4 | −9.18 |
| 5 | | −4.086 | ASP | 0.336 | | | | |
| 6 | Lens 3 | −7.337 | ASP | 0.803 | Plastic | 1.535 | 55.8 | 2.12 |
| 7 | | −1.018 | ASP | 0.271 | | | | |
| 8 | Lens 4 | 1.778 | ASP | 0.308 | Plastic | 1.535 | 55.8 | −2.21 |
| 9 | | 0.667 | ASP | 0.660 | | | | |
| 10 | IR-cut filter | Plano | | 0.280 | Glass | 1.517 | 64.2 | — |
| 11 | | Plano | | 0.352 | | | | |
| 12 | Image | Plano | | — | | | | |

Note:
Reference wavelength is 587.6 nm (d-line).

TABLE 20

Aspheric Coefficients

| Surface# | 2 | 3 | 4 | 5 |
|---|---|---|---|---|
| k = | −9.1514E−01 | −9.0000E+01 | 5.1010E+00 | 5.6321E+00 |
| A4 = | 1.5842E−02 | −6.5878E−02 | −1.8260E−01 | −8.8105E−02 |
| A6 = | −2.2587E−02 | −6.3303E−02 | 2.6984E−02 | −4.8775E−02 |
| A8 = | 1.2326E−02 | −1.5059E−01 | −7.9126E−02 | 3.0659E−01 |
| A10 = | −7.9095E−02 | 3.6709E−02 | 3.3107E−01 | −3.7363E−01 |
| A12 = |  |  | −1.6172E−02 | 4.1609E−01 |
| A14 = |  |  |  | −1.6990E−01 |

| Surface # | 6 | 7 | 8 | 9 |
|---|---|---|---|---|
| k = | 3.0197E+00 | −1.7857E+00 | −4.0503E+01 | −4.4212E+00 |
| A4 = | 9.9602E−02 | 2.2922E−01 | −4.7387E−03 | −4.9825E−02 |
| A6 = | −1.1785E−01 | −2.2681E−01 | −8.3390E−02 | 1.9969E−03 |
| A8 = | 9.5574E−02 | 1.2845E−01 | 4.8518E−02 | 3.8947E−03 |
| A10 = | −4.2194E−02 | −3.1928E−02 | −1.2006E−02 | −1.5714E−03 |
| A12 = | 9.0580E−03 | 1.2191E−03 | 1.5489E−03 | 2.7269E−04 |
| A14 = | −7.4667E−04 | 7.3224E−04 | −1.0197E−04 | −2.1763E−05 |
| A16 = |  | −8.7491E−05 | 2.6811E−06 | 6.4339E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th embodiment | | | |
|---|---|---|---|
| f [mm] | 3.23 | ATmax/ATmin | 1.53 |
| Fno | 2.50 | (R5 + R6)/(R5 − R6) | 1.32 |
| HFOV [deg.] | 42.0 | \|f4/f1\| | 0.61 |
| tan(HFOV) | 0.90 | f2/f | −2.84 |
| V4 | 55.8 | f/Y42 | 1.28 |
| Nmax | 1.650 | TL/Y42 | 1.70 |
| T12/T23 | 1.24 | (\|f3\| + \|f4\|)/(\|f1\| + \|f2\|) | 0.34 |
| T12/T34 | 1.53 | (\|P3\| + \|P4\|)/(\|P1\| + \|P2\|) | 2.41 |
| T23/CT2 | 1.22 | | |

In the image capturing lens system according to the 10th embodiment, when the axial distance between the second lens element 1020 and the third lens element 1030 is T23, and a central thickness of the third lens element 1030 is CT3, the following condition is satisfied: T23<CT3.

In the image capturing lens system according to the 10th embodiment, when a focal length of the first lens element 1010 is f1, a focal length of the second lens element 1020 is f2, a focal length of the third lens element 1030 is f3, and a focal length of the fourth lens element 1040 is f4, the following conditions are satisfied: |f3|<|f1|<|f2|; and |f4|<|f1|<|f2|.

11th Embodiment

Figure 21:
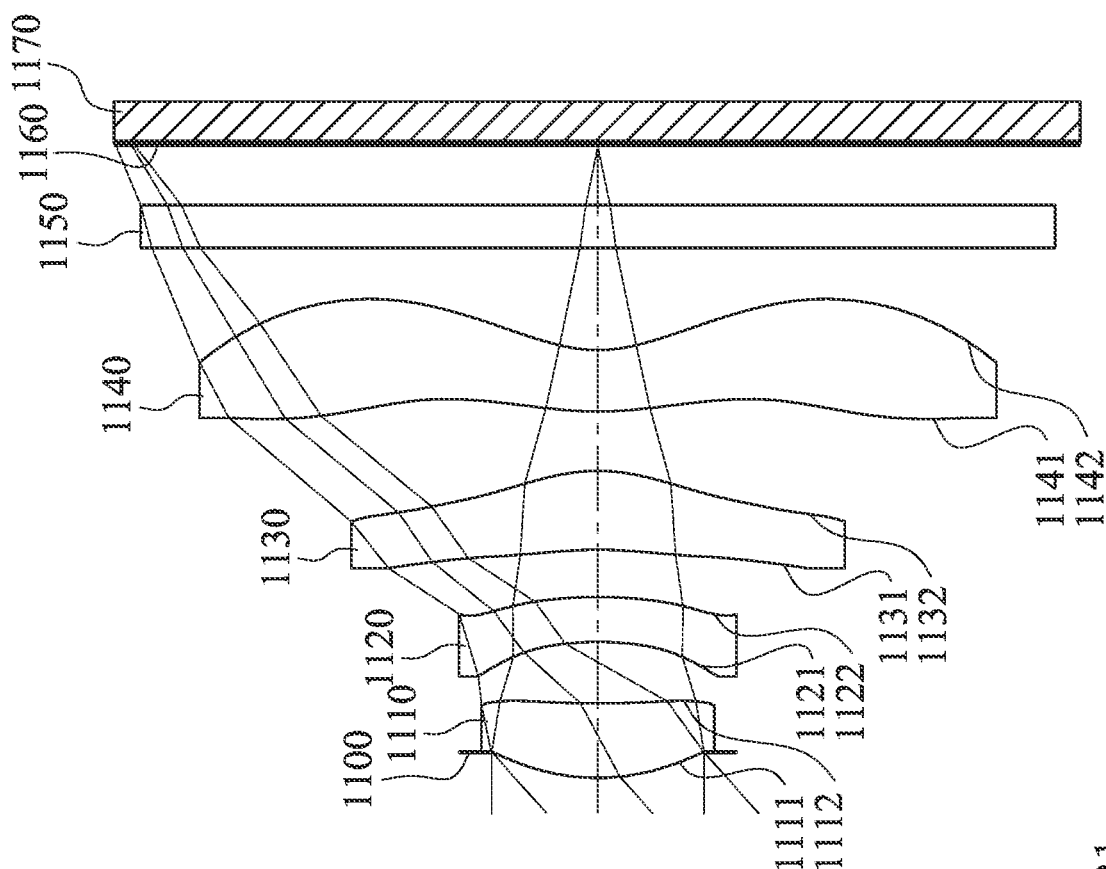
FIG. 21 is a schematic view of an image capturing apparatus according to the 11th embodiment of the present disclosure.
Figure 22:
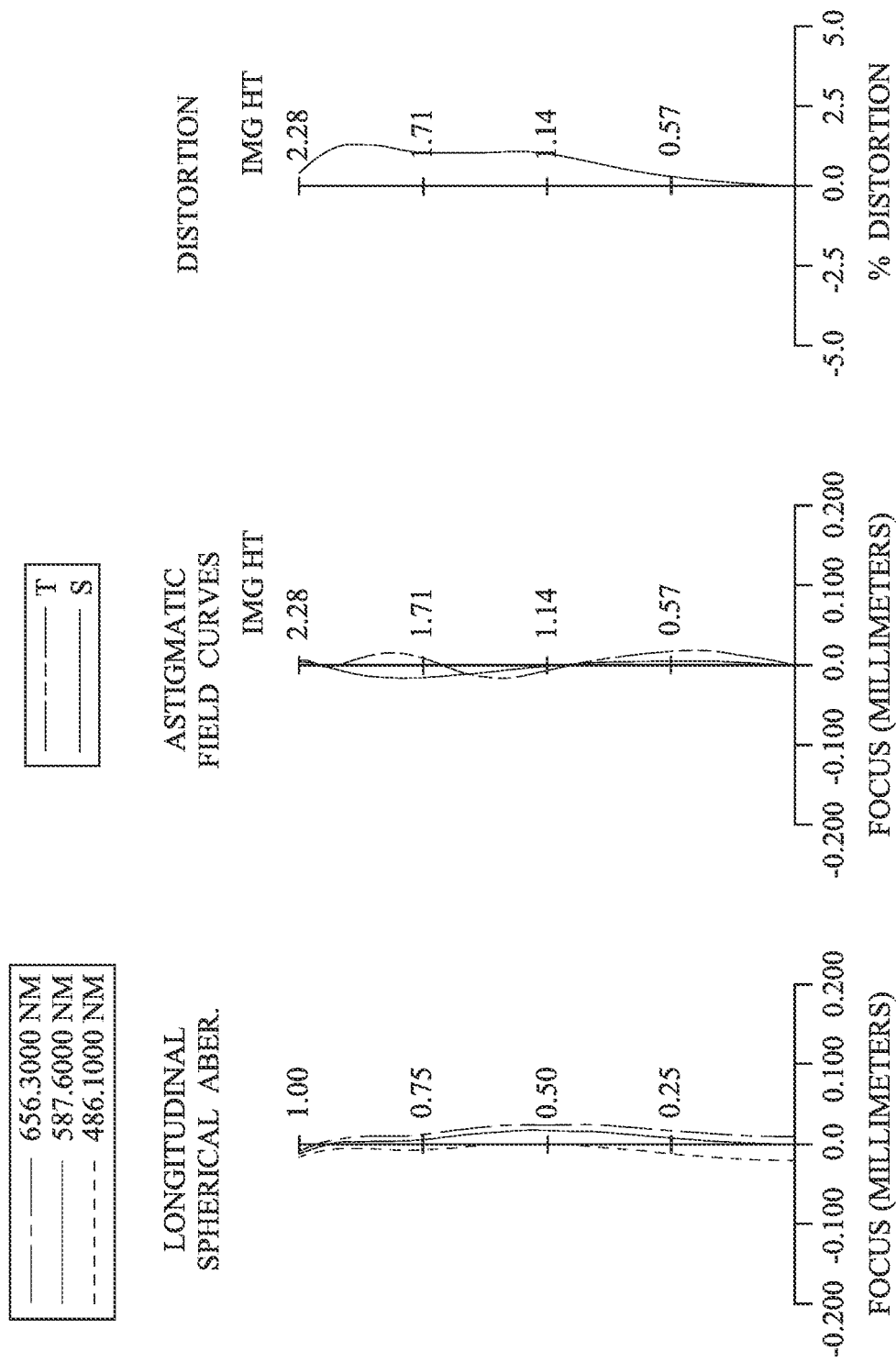
FIG. 22 shows spherical aberration curves, astigmatic field curves and a distortion curve of the image capturing apparatus according to the 11th embodiment.

FIG. 21 is a schematic view of an image capturing apparatus according to the 11th embodiment of the present disclosure. FIG. 22 shows spherical aberration curves, astigmatic field curves and a distortion curve of the image capturing apparatus according to the 11th embodiment. In FIG. 21, the image capturing apparatus includes an image capturing lens system (its reference numeral is omitted) and an image sensor 1170. The image capturing lens system includes, in order from an object side to an image side, an aperture stop 1100, a first lens element 1110, a second lens element 1120, a third lens element 1130, a fourth lens element 1140, an IR-cut filter 1150 and an image surface 1160, wherein the image sensor 1170 is disposed on the image surface 1160 of the image capturing lens system. The image capturing lens system has a total of four lens elements (1110-1140).

The first lens element 1110 with positive refractive power has an object-side surface 1111 being convex in a paraxial region thereof and an image-side surface 1112 being concave in a paraxial region thereof. The first lens element 1110 is made of a plastic material, and has the object-side surface 1111 and the image-side surface 1112 being both aspheric.

The second lens element 1120 with negative refractive power has an object-side surface 1121 being concave in a paraxial region thereof and an image-side surface 1122 being convex in a paraxial region thereof. The second lens element 1120 is made of a plastic material, and has the object-side surface 1121 and the image-side surface 1122 being both aspheric.

The third lens element 1130 with positive refractive power has an object-side surface 1131 being concave in a paraxial region thereof and an image-side surface 1132 being convex in a paraxial region thereof. The third lens element 1130 is made of a plastic material, and has the object-side surface 1131 and the image-side surface 1132 being both aspheric.

The fourth lens element 1140 with negative refractive power has an object-side surface 1141 being convex in a paraxial region thereof and an image-side surface 1142 being concave in a paraxial region thereof. The fourth lens element 1140 is made of a plastic material, and has the object-side surface 1141 and the image-side surface 1142 being both aspheric. Furthermore, the image-side surface 1142 of the fourth lens element 1140 includes at least one convex shape in an off-axis region thereof.

The IR-cut filter 1150 is made of a glass material and located between the fourth lens element 1140 and the image surface 1160, and will not affect the focal length of the image capturing lens system.

The detailed optical data of the 11th embodiment are shown in Table 21 and the aspheric surface data are shown in Table 22 below.

TABLE 21

11th Embodiment
f = 2.54 mm, Fno = 2.45, HFOV = 41.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.126 | | | | |
| 2 | Lens 1 | 1.065 | ASP | 0.364 | Plastic | 1.544 | 56.0 | 2.55 |
| 3 | | 4.028 | ASP | 0.301 | | | | |
| 4 | Lens 2 | −1.565 | ASP | 0.220 | Plastic | 1.660 | 20.4 | −9.95 |
| 5 | | −2.170 | ASP | 0.231 | | | | |
| 6 | Lens 3 | −1.940 | ASP | 0.386 | Plastic | 1.544 | 56.0 | 2.48 |
| 7 | | −0.851 | ASP | 0.290 | | | | |
| 8 | Lens 4 | 1.695 | ASP | 0.300 | Plastic | 1.544 | 56.0 | −2.32 |
| 9 | | 0.679 | ASP | 0.500 | | | | |
| 10 | IR-cut filter | Plano | | 0.210 | Glass | 1.517 | 64.2 | — |
| 11 | | Plano | | 0.303 | | | | |
| 12 | Image | Plano | | — | | | | |

Note:
Reference wavelength is 587.6 nm (d-line).

TABLE 22

Aspheric Coefficients

| Surface # | 2 | 3 | 4 | 5 |
|---|---|---|---|---|
| k = | −7.3204E−01 | −9.0000E+01 | 4.6870E+00 | −3.2001E+00 |
| A4 = | 7.9641E−02 | 3.5831E−02 | −4.2757E−01 | −9.9887E−02 |
| A6 = | −4.1794E−01 | −1.2963E+00 | 6.3181E−01 | −1.0877E+00 |
| A8 = | 2.1803E+00 | 2.1422E+00 | −8.4214E+00 | 4.8641E+00 |
| A10 = | −6.0951E+00 | −6.0305E+00 | 4.2149E+01 | −1.5288E+01 |
| A12 = | | | −4.7083E+01 | 4.3836E+01 |
| A14 = | | | | −3.9915E+01 |

| Surface # | 6 | 7 | 8 | 9 |
|---|---|---|---|---|
| k = | 3.3037E−02 | −5.1133E+00 | −2.7117E+01 | −4.9853E+00 |
| A4 = | 7.5766E−01 | −3.9575E−02 | −6.1119E−02 | −1.7429E−01 |
| A6 = | −8.0202E−01 | 1.6463E+00 | −1.8367E−01 | 9.7125E−02 |
| A8 = | −1.1910E+00 | −4.3953E+00 | 2.2954E−01 | −5.4327E−02 |
| A10 = | 3.5038E+00 | 5.4422E+00 | −1.1303E−01 | 2.2721E−02 |
| A12 = | −2.8883E+00 | −3.5618E+00 | 2.8672E−02 | −5.7459E−03 |
| A14 = | 8.1147E−01 | 1.1882E+00 | −3.6913E−03 | 7.4487E−04 |
| A16 = | | −1.5984E−01 | 1.8876E−04 | −3.6595E−05 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th embodiment | | | |
|---|---|---|---|
| f [mm] | 2.54 | ATmax/ATmin | 1.30 |
| Fno | 2.45 | (R5 + R6)/(R5 − R6) | 2.56 |
| HFOV [deg.] | 41.8 | |f4/f1| | 0.91 |
| tan(HFOV) | 0.89 | f2/f | −3.92 |
| V4 | 56.0 | f/Y42 | 1.30 |
| Nmax | 1.660 | TL/Y42 | 1.60 |
| T12/T23 | 1.30 | (|f3| + |f4|)/(|f1| + |f2|) | 0.38 |
| T12/T34 | 1.04 | (|P3| + |P4|)/(|P1| + |P2|) | 1.69 |
| T23/CT2 | 1.05 | | |

In the image capturing lens system according to the 11th embodiment, when the axial distance between the second lens element 1120 and the third lens element 1130 is T23, and a central thickness of the third lens element 1130 is CT3, the following condition is satisfied: T23<CT3.

In the image capturing lens system according to the 11th embodiment, when a focal length of the first lens element 1110 is f1, a focal length of the second lens element 1120 is f2, a focal length of the third lens element 1130 is f3, and a focal length of the fourth lens element 1140 is f4, the following conditions are satisfied: |f3|<|f1|<|f2|; and |f4|<|f1|<|f2|.

12th Embodiment

Figure 24:
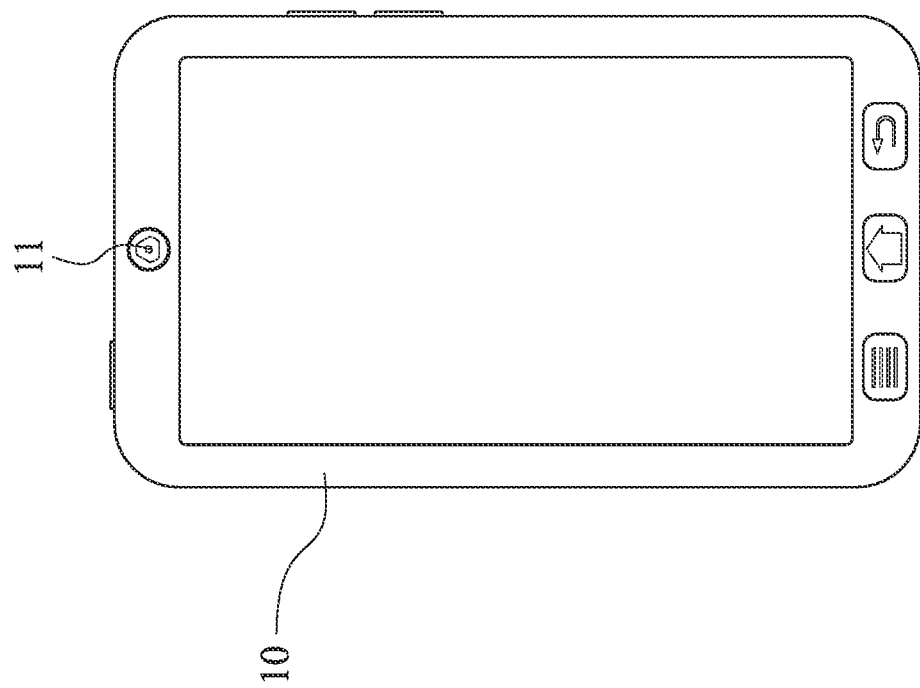
FIG. 24 is a schematic view of an electronic device according to the 12th embodiment of the present disclosure.

FIG. 24 is a schematic view of an electronic device 10 according to the 12th embodiment of the present disclosure. The electronic device 10 of the 12th embodiment is a smart phone, wherein the electronic device 10 includes an image capturing apparatus 11. The image capturing apparatus 11 includes an image capturing lens system (not shown herein) according to the present disclosure and an image sensor (not shown herein), wherein the image sensor is disposed on an image surface of the image capturing lens system.

13th Embodiment

Figure 25:
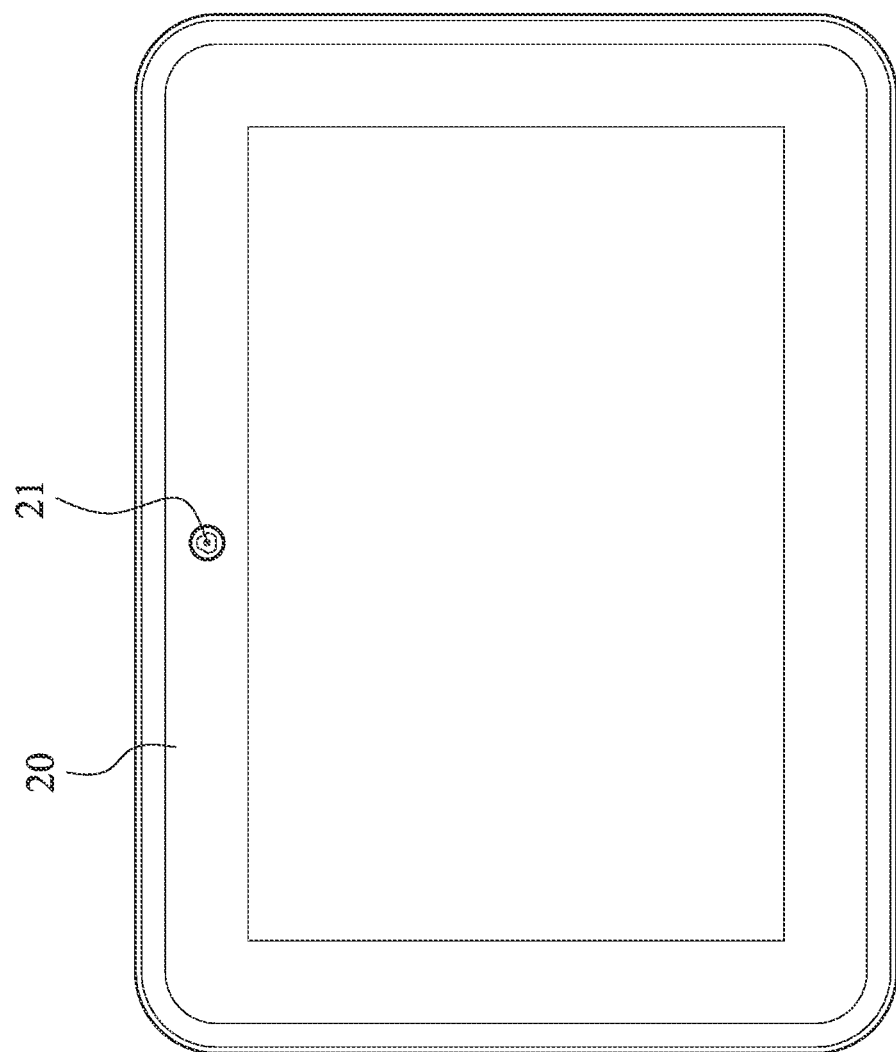
FIG. 25 is a schematic view of an electronic device according to the 13th embodiment of the present disclosure.

FIG. 25 is a schematic view of an electronic device 20 according to the 13th embodiment of the present disclosure. The electronic device 20 of the 13th embodiment is a tablet personal computer, wherein the electronic device 20 includes an image capturing apparatus 21. The image capturing apparatus 21 includes an image capturing lens system (not shown herein) according to the present disclosure and an image sensor (not shown herein), wherein the image sensor is disposed on an image surface of the image capturing lens system.

14th Embodiment

Figure 26:
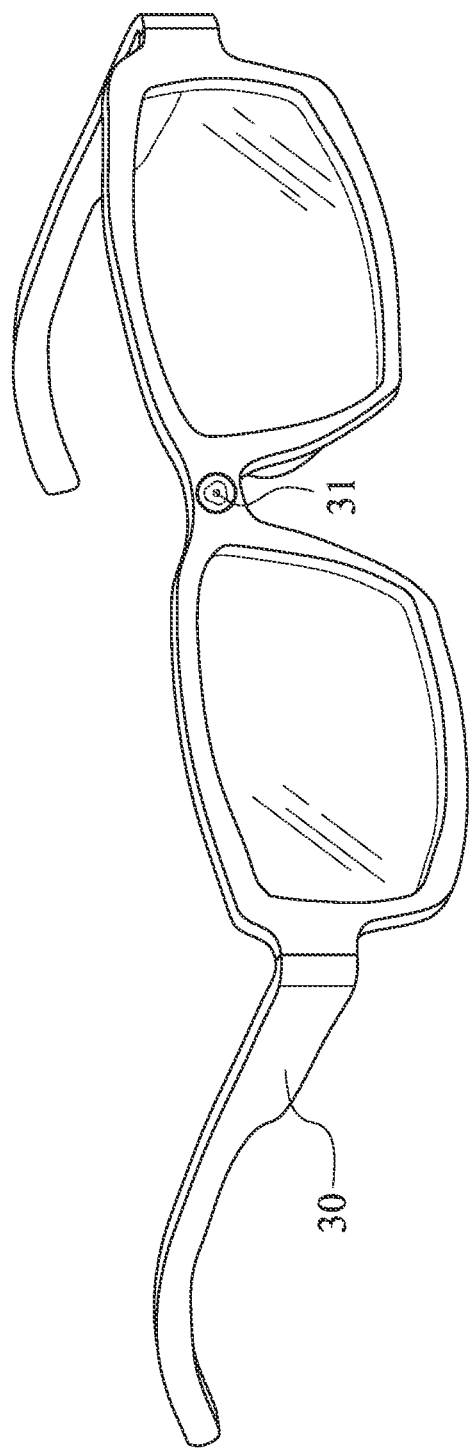
FIG. 26 is a schematic view of an electronic device according to the 14th embodiment of the present disclosure.

FIG. 26 is a schematic view of an electronic device 30 according to the 14th embodiment of the present disclosure. The electronic device 30 of the 14th embodiment is a head-mounted display (HMD), wherein the electronic device 30 includes an image capturing apparatus 31. The image capturing apparatus 31 includes an image capturing lens system (not shown herein) according to the present disclosure and an image sensor (not shown herein), wherein the image sensor is disposed on an image surface of the image capturing lens system.

The foregoing description, for purpose of explanation, has been described with reference to specific embodiments. It is to be noted that Tables 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image lens assembly comprising, in order from an object side to an image side:
    a first lens element with positive refractive power having an object-side surface being convex in a paraxial region thereof;
    a second lens element with negative refractive power having an object-side surface being concave in a paraxial region thereof;
    a third lens element with positive refractive power having an object-side surface being concave in a paraxial region thereof and an image-side surface being convex in a paraxial region thereof; and
    a fourth lens element having negative refractive power;
    wherein the optical image lens assembly further comprises an aperture stop disposed between the first lens element and an image surface;
    wherein an axial distance between the second lens element and the third lens element is a maximum among all axial distances between adjacent lens elements in the optical image lens assembly; a total number of lens elements in the optical image lens assembly is four; wherein an f-number of the optical image lens assembly is Fno, the axial distance between the second lens element and the third lens element is T23, a central thickness of the second lens element is CT2, and the following conditions are satisfied:

$1.50<Fno\leq2.10$; and $0.80<T23/CT2<2.50$;

wherein a maximum of absolute values of curvature radii of object-side surfaces and image-side surfaces of the first lens element, the second lens element, the third lens element and the fourth lens element is an absolute value of a curvature radius of the object-side surface of the third lens element.

2. The optical image lens assembly of claim 1, wherein a maximum of refractive indexes of the first lens element, the second lens element, the third lens element and the fourth lens element is Nmax, and the following condition is satisfied:

$1.66\leq Nmax$.

3. The optical image lens assembly of claim 1, wherein both of an object-side surface and an image-side surface of each of the first lens element, the second lens element, the third lens element and the fourth lens element are aspheric; all of the first lens element, the second lens element, the third lens element and the fourth lens element are made of plastic material; the curvature radius of the object-side surface of the third lens element is R5, a curvature radius of the image-side surface of the third lens element is R6, and the following condition is satisfied:

$1.0<(R5+R6)/(R5-R6)<3.50$.

4. The optical image lens assembly of claim 1, wherein the curvature radius of the object-side surface of the third lens element is R5, a curvature radius of the image-side surface of the third lens element is R6, and the following condition is satisfied:

$1.0<(R5+R6)/(R5-R6)<2.0$.

5. The optical image lens assembly of claim 1, wherein a focal length of the first lens element is f1, a focal length of the second lens element is f2, a focal length of the fourth lens element is f4, and the following conditions are satisfied:

$|f1|<|f2|$; and $|f4|<|f2|$.

6. The optical image lens assembly of claim 1, wherein at least one of an object-side surface and an image-side surface of the fourth lens element comprises at least one inflection point.

7. The optical image lens assembly of claim 1, wherein an absolute value of a curvature radius of an image-side surface of the first lens element is greater than an absolute value of a curvature radius of an image-side surface of the second lens element.

8. The optical image lens assembly of claim 1, wherein a surface of one of the four lens elements which is adjacent to an object side of the aperture stop is concave in a paraxial region thereof; a surface of one of the four lens elements which is adjacent to an image side of the aperture stop is concave in a paraxial region thereof.

9. An image capturing device, comprising:
    the optical image lens assembly of claim 1; and
    an image sensor disposed on the image surface of the optical image lens assembly.

10. An optical image lens assembly comprising, in order from an object side to an image side:
   a first lens element having positive refractive power;
   a second lens element having negative refractive power;
   a third lens element; and
   a fourth lens element having an object-side surface being convex in a paraxial region thereof and an image-side surface being concave in a paraxial region thereof;
   wherein the optical image lens assembly further comprises an aperture stop disposed between the first lens element and the second lens element;
   wherein a total number of lens elements in the optical image lens assembly is four;
   wherein an axial distance between the first lens element and the second lens element is T12, an axial distance between the second lens element and the third lens element is T23, a central thickness of the third lens element is CT3, an Abbe number of the fourth lens element is V4, a maximum of refractive indexes of the first lens element, the second lens element, the third lens element and the fourth lens element is Nmax, and the following conditions are satisfied:

T12<T23;

T23<CT3;

V4<30; and 1.65≤Nmax;

wherein a curvature radius of an object-side surface of the second lens element and a curvature radius of an image-side surface of the second lens element have the same sign.

11. The optical image lens assembly of claim 10, wherein the third lens element has positive refractive power.

12. The optical image lens assembly of claim 10, wherein the first lens element has an object-side surface being convex in a paraxial region thereof; the third lens element has an image-side surface being convex in a paraxial region thereof.

13. The optical image lens assembly of claim 10, wherein the maximum of the refractive indexes of the first lens element, the second lens element, the third lens element and the fourth lens element is Nmax, and the following condition is satisfied:

1.66≤Nmax.

14. An optical image lens assembly comprising, in order from an object side to an image side:
   a first lens element having positive refractive power;
   a second lens element having negative refractive power;
   a third lens element; and
   a fourth lens element having an object-side surface being convex in a paraxial region thereof and an image-side surface being concave in a paraxial region thereof;
   wherein a total number of lens elements in the optical image lens assembly is four;
   wherein an axial distance between the first lens element and the second lens element is T12, an axial distance between the second lens element and the third lens element is T23, a central thickness of the third lens element is CT3, an Abbe number of the fourth lens element is V4, a maximum of refractive indexes of the first lens element, the second lens element, the third lens element and the fourth lens element is Nmax, a maximum of axial distances between every two lens elements of the first lens element, the second lens element, the third lens element and the fourth lens element which are adjacent to each other is ATmax, a minimum of the axial distances between every two lens elements of the first lens element, the second lens element, the third lens element and the fourth lens element which are adjacent to each other is ATmin, and the following conditions are satisfied:

T12<T23;

T23<CT3;

23.3≤V4≤26.6;

1.65≤Nmax; and 1.0<ATmax/ATmin<8.0;

wherein a curvature radius of an object-side surface of the second lens element and a curvature radius of an image-side surface of the second lens element have the same sign.

15. The optical image lens assembly of claim 14, wherein the first lens element has an object-side surface being convex in a paraxial region thereof; the third lens element has an image-side surface being convex in a paraxial region thereof.

16. The optical image lens assembly of claim 14, wherein the third lens element has positive refractive power; the maximum of the refractive indexes of the first lens element, the second lens element, the third lens element and the fourth lens element is Nmax, and the following condition is satisfied:

1.66≤Nmax.

17. The optical image lens assembly of claim 14, wherein the maximum of the axial distances between every two lens elements of the first lens element, the second lens element, the third lens element and the fourth lens element which are adjacent to each other is ATmax, the minimum of the axial distances between every two lens elements of the first lens element, the second lens element, the third lens element and the fourth lens element which are adjacent to each other is ATmin, and the following condition is satisfied:

4.08≤ATmax/ATmin<8.0.

* * * * *